United States Patent
Gonzales et al.

(10) Patent No.: US 11,408,142 B2
(45) Date of Patent: Aug. 9, 2022

(54) DRAINING CONSTRUCTION WRAP AND METHODS FOR SAME

(71) Applicants: R. H. Tamlyn & Sons, LP, Stafford, TX (US); Lei Zhou, Sammanish, WA (US); Xiaojun Fei, Stafford, TX (US)

(72) Inventors: Miguel Gonzales, Pearsland, TX (US); Lei Zhou, Sammanish, WA (US); Xiaojun Fei, Stafford, TX (US)

(73) Assignee: R. H. Tamlyn & Sons, LP, Stafford, TX (US)

( * ) Notice: Subject to any disclaimer, the term of this patent is extended or adjusted under 35 U.S.C. 154(b) by 177 days.

(21) Appl. No.: 16/271,518

(22) Filed: Feb. 8, 2019

(65) Prior Publication Data

US 2019/0249419 A1    Aug. 15, 2019

(30) Foreign Application Priority Data

Feb. 10, 2018    (CN) .......................... 201820240747.8

(51) Int. Cl.
    *E04B 1/62*        (2006.01)
    *E04B 1/66*        (2006.01)
    (Continued)

(52) U.S. Cl.
    CPC ............ *E02D 31/025* (2013.01); *B32B 5/022* (2013.01); *B32B 5/18* (2013.01); *B32B 5/245* (2013.01);
    (Continued)

(58) Field of Classification Search
    USPC ............... 52/169.5, 302.1, 302.3, 302.6, 408
    See application file for complete search history.

(56) References Cited

U.S. PATENT DOCUMENTS

| 2,669,114 A | 2/1954 | Mills |
| 3,073,066 A | 1/1963 | Edwards et al. |

(Continued)

FOREIGN PATENT DOCUMENTS

| CA | 2777993 A1 | 11/2012 |
| CN | 208088530  | 11/2018 |

(Continued)

OTHER PUBLICATIONS

"New flexible and stronger aerogel expected to open new applications for super-insulator", The American Ceramic Society, [Online]. Retrieved from the Internet: <URL: http://ceramics.org/ceramic-tech-today/nasas-new-flexible-and-stronger-aerogel-expected-to-open-new-applications-for-super-insulator>, (Aug. 19, 2012), 4 pages.

(Continued)

*Primary Examiner* — Robert Canfield
(74) *Attorney, Agent, or Firm* — Schwegman Lundberg & Woessner, P.A.

(57) ABSTRACT

A draining construction wrap includes a pliable moisture impermeable layer having interior and exterior surfaces. A drainage framework is configured to channel moisture across the exterior surface of the pliable moisture impermeable layer. The drainage framework includes a plurality of support struts. Each of the support struts includes a base strut portion coupled with the exterior surface, a strut support face, and a strut body extending from the base strut portion to the strut support face. A plurality of drain channels are between the support struts. The draining construction wrap includes an installation surface configured for coupling with an outer wall. The installation surface includes the strut support faces of the plurality of support struts. The strut bodies of the plurality of support struts brace the installation surface and the pliable moisture impermeable layer is (Continued)

recessed from the installation surface with a strut gap therebetween.

28 Claims, 17 Drawing Sheets

(51) Int. Cl.
    *E02D 31/02*     (2006.01)
    *E04B 1/64*     (2006.01)
    *B32B 5/02*     (2006.01)
    *B32B 5/18*     (2006.01)
    *B32B 5/24*     (2006.01)
    *B32B 13/12*     (2006.01)

(52) U.S. Cl.
    CPC .............. *B32B 13/12* (2013.01); *E02D 31/02* (2013.01); *E04B 1/64* (2013.01); *E04B 1/665* (2013.01); *B32B 2307/726* (2013.01); *B32B 2307/7265* (2013.01); *B32B 2419/00* (2013.01); *E02D 2300/0095* (2013.01); *E04B 1/625* (2013.01)

(56) References Cited

U.S. PATENT DOCUMENTS

| | | | |
|---|---|---|---|
| 3,507,634 A * | 4/1970 | O'Driscoll | B23K 20/04 |
| | | | 428/573 |
| 3,525,663 A * | 8/1970 | Hale | B32B 27/00 |
| | | | 428/179 |
| 3,563,038 A | 2/1971 | Healy et al. | |
| 3,888,087 A * | 6/1975 | Bergsland | E02D 31/02 |
| | | | 405/36 |
| 4,057,500 A | 11/1977 | Wager | |
| 4,212,692 A * | 7/1980 | Rasen | D04H 3/16 |
| | | | 156/167 |
| 4,284,447 A | 8/1981 | Dickens et al. | |
| 4,572,700 A | 2/1986 | Mantarro et al. | |
| 4,622,138 A | 11/1986 | Wager | |
| 4,631,221 A * | 12/1986 | Disselbeck | B32B 5/026 |
| | | | 428/166 |
| 4,733,989 A | 3/1988 | Harriett | |
| 4,840,515 A * | 6/1989 | Freese | E02B 11/005 |
| | | | 405/36 |
| 4,925,342 A | 5/1990 | Hendy | |
| 4,956,951 A * | 9/1990 | Kannankeril | B29C 51/22 |
| | | | 52/169.5 |
| 5,044,821 A * | 9/1991 | Johnsen | E02D 31/02 |
| | | | 405/50 |
| 5,263,792 A * | 11/1993 | Davis | E02B 11/00 |
| | | | 405/45 |
| 5,364,686 A * | 11/1994 | Disselbeck | B29D 24/002 |
| | | | 428/174 |
| 5,383,314 A * | 1/1995 | Rothberg | E02D 31/02 |
| | | | 405/43 |
| 5,673,521 A * | 10/1997 | Coulton | E04D 13/176 |
| | | | 126/671 |
| 5,692,348 A * | 12/1997 | Ambrosino | E04B 1/70 |
| | | | 405/43 |
| 5,860,259 A * | 1/1999 | Laska | E04B 1/7612 |
| | | | 52/302.3 |
| 6,241,421 B1 | 6/2001 | Harvie et al. | |
| 6,684,579 B2 | 2/2004 | Brunson et al. | |
| 6,691,472 B2 * | 2/2004 | Hubert | E02D 31/02 |
| | | | 405/107 |
| 6,786,013 B2 * | 9/2004 | Coulton | B32B 3/28 |
| | | | 405/45 |
| 6,802,668 B2 * | 10/2004 | Parker | E02D 31/02 |
| | | | 405/49 |
| 6,955,847 B1 * | 10/2005 | Itou | A44B 18/0011 |
| | | | 264/257 |
| 7,131,788 B2 * | 11/2006 | Ianniello | E01C 3/00 |
| | | | 405/50 |
| 7,493,738 B2 * | 2/2009 | Bui | |
| 7,536,835 B2 * | 5/2009 | Schluter | E04F 15/08 |
| | | | 52/390 |
| 7,607,270 B2 | 10/2009 | Ehrman et al. | |
| 8,647,734 B2 | 2/2014 | Keene | |
| 8,695,300 B2 | 4/2014 | Hartl | |
| 8,728,605 B2 | 5/2014 | Payne et al. | |
| 9,091,049 B2 | 7/2015 | Walker | |
| 9,145,688 B2 | 9/2015 | Hunt-Hansen et al. | |
| 9,366,033 B2 * | 6/2016 | Johnson | E04F 13/04 |
| 9,771,703 B1 | 9/2017 | Golding, Jr. et al. | |
| 10,161,129 B2 * | 12/2018 | Hickie | B32B 5/022 |
| 10,364,579 B2 * | 7/2019 | Norwood | E04F 13/0864 |
| 10,676,918 B2 | 6/2020 | Caruso | |
| 11,008,756 B2 | 5/2021 | Krasnoff et al. | |
| 11,274,437 B2 | 3/2022 | Gonzales et al. | |
| 2005/0090170 A1 * | 4/2005 | Jackson | E04F 13/002 |
| | | | 442/225 |
| 2006/0260233 A1 * | 11/2006 | Schluter | E04F 15/18 |
| | | | 52/302.3 |
| 2006/0277854 A1 * | 12/2006 | Egan | E04B 1/80 |
| | | | 52/302.3 |
| 2007/0004306 A1 | 1/2007 | Leeser et al. | |
| 2007/0154698 A1 | 7/2007 | Stepanian | |
| 2007/0180791 A1 * | 8/2007 | Amster | E04F 13/04 |
| | | | 52/741.3 |
| 2008/0032114 A1 | 2/2008 | Squires et al. | |
| 2008/0041005 A1 | 2/2008 | Ehrman et al. | |
| 2009/0029109 A1 | 1/2009 | Seth et al. | |
| 2009/0193738 A1 * | 8/2009 | Kortuem | E02D 31/02 |
| | | | 52/302.1 |
| 2010/0107533 A1 | 5/2010 | Stephan | |
| 2010/0233427 A1 * | 9/2010 | De Giuseppe | E02D 31/004 |
| | | | 428/119 |
| 2011/0197987 A1 | 8/2011 | Koravos et al. | |
| 2012/0247040 A1 | 10/2012 | Buoni et al. | |
| 2013/0089696 A1 | 4/2013 | Pargeter et al. | |
| 2013/0180203 A1 * | 7/2013 | Xiangli | E04B 1/625 |
| | | | 52/741.3 |
| 2013/0344279 A1 | 12/2013 | Doshi et al. | |
| 2014/0002551 A1 | 9/2014 | Li, Jr. et al. | |
| 2016/0002914 A1 | 1/2016 | Snyder et al. | |
| 2017/0342709 A1 | 11/2017 | Dahlin | |
| 2018/0320368 A1 | 11/2018 | Gonzales et al. | |
| 2020/0270858 A1 | 8/2020 | Gonzales et al. | |
| 2020/0354965 A1 | 11/2020 | Attebery, II | |
| 2021/0129462 A1 | 5/2021 | Rolland et al. | |
| 2021/2308741 | 7/2021 | Krasnoff et al. | |
| 2021/0355687 A1 | 11/2021 | Hascher et al. | |

FOREIGN PATENT DOCUMENTS

| | | |
|---|---|---|
| CN | 112757726 A | 5/2021 |
| DE | 19507041 A1 | 9/1996 |
| DE | 102017117375 | 2/2019 |
| EP | 3885125 A1 | 9/2021 |
| WO | 2007026108 | 3/2007 |
| WO | 2017200831 | 11/2017 |
| WO | WO-2019036783 A1 | 2/2019 |
| WO | WO-2019074866 A1 | 4/2019 |
| WO | WO-2019228734 A1 | 12/2019 |
| WO | WO-2021231270 A1 | 11/2021 |

OTHER PUBLICATIONS

"Strong and Flexible Aerogels", [Online]. Retrieved from the Internet: <URL: http://www.aerogel.org/?p=1058>, (Accessed Jan. 13, 2017), 22 pages.

"U.S. Appl. No. 15/971,948, Restriction Requirement dated Aug. 16, 2019", 7 pages.

"U.S. Appl. No. 15/971,948, Response filed Oct. 16, 2019 to Restriction Requirement dated Aug. 16, 2019", 7 pg.

"U.S. Appl. No. 15/971,948, Non Final Office Action dated Feb. 5, 2020", 13 pages.

"U.S. Appl. No. 15/971,948, Response filed Jul. 3, 2020 to Non Final Office Action dated Feb. 5, 2020", 14 pgs.

(56) References Cited

OTHER PUBLICATIONS

"U.S. Appl. No. 15/971,948, Final Office Action dated Oct. 29, 2020", 13 pages.
"U.S. Appl. No. 15/971,948, Response filed Apr. 29, 2021 to Final Office Action dated Oct. 29, 2020", 19 pgs.
"U.S. Appl. No. 16/872,001, Non Final Office Action dated May 12, 2021", 12 pages.
"International Application Serial No. PCT US2021 031530, Written Opinion dated Jun. 9, 2021", 5 pages.
"International Application Serial No. PCT US2021 031530, International Search Report dated Jun. 9, 2021", 3 pages.
"U.S. Appl. No. 15/971,948, Examiner Interview Summary dated Jan. 6, 2022", 3 pgs.
"U.S. Appl. No. 15/971,948, Final Office Action dated Mar. 8, 2022", 14 pgs.
"U.S. Appl. No. 15/971,948, Non Final Office Action dated Oct. 5, 2021", 27 pgs.
"U.S. Appl. No. 15/971,948, Response filed Jan. 5, 2022 to Non Final Office Action dated Oct. 5, 2021", 16 pgs.
"U.S. Appl. No. 16/872,001, Corrected Notice of Allowability dated Feb. 9, 2022", 2 pgs.
"U.S. Appl. No. 16/872,001, Notice of Allowance dated Jan. 12, 2022", 10 pgs.
"U.S. Appl. No. 16/872,001, Response filed Oct. 6, 2021 to Non Final Office Action dated May 12, 2021", 14 pgs.

\* cited by examiner

DRAINING CONSTRUCTION WRAP AND METHODS FOR SAME

CLAIM OF PRIORITY

This patent application claims the benefit of priority of Lei Zhou et. al, Chinese Utility Model Patent Application Number 201820240747.8, entitled "WATERPROOF AND MOISTURE PERMEABLE FABRIC WITH THREE-DIMENSIONAL STRUCTURE, PRODUCTION LINE AND WALL STRUCTURE," filed on Feb. 10, 2018, which is hereby incorporated by reference herein in its entirety.

CROSS-REFERENCE TO RELATED PATENT DOCUMENTS

This patent application is also related to U.S. patent application Ser. No. 15/971,948, entitled "THERMAL INSULATING CONSTRUCTION WRAP AND METHODS FOR SAME," filed on May 4, 2018.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright R. H. Tamlyn & Sons, LP; Stafford, Tex., USA. All Rights Reserved.

TECHNICAL FIELD

This document pertains generally, but not by way of limitation, to construction wraps for building applications.

BACKGROUND

When constructing buildings (e.g., homes, offices or the like) a moisture barrier is, in some examples, used on the exterior of the building. For instance, a house or construction wrap (herein a construction wrap) is applied over the plywood or other material of the building. The construction wrap encloses plywood, framing, insulation and other components of the building and minimizes water intrusion. External fascia, such as brick, stone, siding, stucco or the like, are applied over the construction wrap to provide a decorative exterior to the building (e.g., an outer wall). Water intrusion through the external fascia is intercepted by the construction wrap and diverted away from the covered components of the building.

Construction wrap, in some examples includes a pliable polymer that is wrapped around the features of the building including, but not limited to, walls, corners, fenestration openings (openings for doors or window), vent openings or the like. One example of a construction wrap is Tamlyn Wrap, a registered trademark of R. H. Tamlyn & Sons, LP.

OVERVIEW

The present inventors have recognized, among other things, that a problem to be solved includes minimizing the collection of moisture between an outer wall and a construction wrap. Construction wraps include a moisture impermeable layer. Moisture incident on the layer is diverted downwardly (e.g., by gravity). In some examples, drainage of moisture is frustrated or prevented because of engagement of the outer wall to the construction wrap. The engagement interrupts the flow of moisture along the construction wrap and traps moisture between the moisture impermeable layer and the outer wall. In other examples the construction wrap includes linear pliable ridges extending along the wrap to increase drainage based on the contour of the ridges relative to the wrap substrate. However, one or more of the ridge, moisture impermeable layer, inner wall or the like are deformable, and engagement of the outer wall (siding or the like) with the wrap deforms one or more of these features, such as the ridge, and accordingly minimizes the contour. In some examples, moisture remains trapped between the construction wrap and the outer wall and fails to drain. Further still, the engagement between the wrap and the outer wall minimizes ventilation and accordingly decreases evaporation of the trapped moisture.

In still other examples, the engagement of the outer wall to the construction wrap (plain wrap or wrap with deformable ridges) enhances capillary action between the outer wall and the construction wrap that traps and retains moisture to the locus of engagement and the surrounding area around the locus. Accordingly, even where contoured space is provided between the moisture impermeable layer and the outer wall intermittent engagement at these loci traps and retains moisture between the wrap substrate and the outer wall. Trapping of moisture increases the risk of ingress and other complications with the building including, but not limited to, water damage, mold growth, environment control, odor or the like.

The present subject matter provides a solution to these problems with a draining construction wrap including a drainage framework as a structural component of the wrap. The draining construction wrap includes a pliable moisture impermeable layer (e.g., thermoplastic polyolefins, laminates including a non-woven substrate, foils, polymer films or the like). The drainage framework extends from the pliable moisture impermeable layer and provides a braced installation surface spaced from the impermeable layer. In some examples, the drainage framework includes a plurality of support struts extending from the pliable moisture impermeable layer to strut support faces that provide the installation surface for coupling with the outer wall. The strut support faces are remote relative to the impermeable layer, and the strut bodies of the plurality of support struts are rigid compared to the impermeable layer. The support struts accordingly act as posts, pilings, columns or the like and brace the installation surface and space the surface from the impermeable layer according to a strut gap (e.g., the length of the strut bodies). Drain channels extend between the support struts to readily divert moisture to a weep hole, screen or the like.

With the drainage framework including the plurality of support struts, the installed outer wall is positioned away from the impermeable layer according to the strut gap. Engagement of the outer wall (e.g., panels, siding, masonry, stucco) to the draining construction wrap is localized to the strut support faces of the support struts and spaced from the moisture impermeable layer. Further, the support struts brace the strut support faces and the installation surface and ensure the outer wall remains spaced from the moisture impermeable layer, for instance with engagement of the outer wall to the installation surface. Accordingly, the drain channels between the support struts are maintained thereby enhancing drainage, facilitating ventilation and evaporation, and minimizing capillary action between the outer wall and the moisture impermeable layer.

The subject matter described herein provides a clearance layer, such as a drainage framework, between the inner wall and the outer wall of a structure. The drainage framework guides the flow of moisture (e.g., diverts water) and promotes ventilation. For instance, moisture condensation is collected on the surface of the waterproof and moisture permeable functional layer and is attached on the waterproof and moisture permeable fabric, and flows down the drain channels, thereby drying the layers. Additionally, ventilated air in the drain channels directs air flow between the bottom and top of the draining construction wrap to evaporate collected moisture. The elastic protrusions (e.g., support struts) form a three-dimensional structure that ensures clearance between the inner wall and the outer wall to further improve the moisture removal performance. In some examples, the elastic protrusions include elasticity (e.g., limited elasticity relative to the pliable layers) that enable the exterior wall panel and protrusions to absorb impact and vibration during construction so the exterior wall panel (especially panels made from cement) are not liable to be damaged (e.g., broken, cracked or the like) during construction including installation. Additionally, the drainage framework provided with the draining construction wraps described herein provide a rainscreen and structural support in a consolidated system, thereby facilitating construction by combining features provided previously with construction wraps, and separate spacing components (such as furring strips).

In examples, the thickness of the elastic protrusions (e.g., height) is 1 mm-20 mm or more, and the diameter of the elastic protrusions is between 1 mm-20 mm. Optionally, the elastic protrusions are distributed in one or more densities including, but not limited to, 50-800 protrusions per square meter. Additionally, the elastic protrusions include a variety of profiles (e.g., strut profiles) including, but not limited to, spherical, semi-spherical, cylindrical shapes or the like.

The draining construction wraps described herein, are optionally constructed in one or more methods. For example, the elastic protrusions are formed through one or more of foaming formation on the surface of the waterproof and moisture permeable fabric (permeable or impermeable layers) with injection molding formation on the surface. In other examples the elastic protrusions are bonded with at least one of the layers with methods including, but not limited to, hot cutting, hot stamping, thermal radiation heating, laser welding, sonic heating or the like.

The draining construction wraps described herein, in some examples, include composite layers having two or more layers including nonwoven (permeable) component layers and moisture impermeable layers. In an example, the composite layers are constructed as a waterproof and moisture permeable fabric structure with a hot pressing process during production. The nonwoven fabric is pressed while heated onto both sides of a waterproof (moisture impermeable) and gas permeable film (a moisture impermeable component layer that is moisture impermeable and gas or vapor permeable as described herein) such as PE or TPU. The elastic protrusions are then coupled with the surface of the composite layer. For instance, the elastic protrusions are coupled with hot stamping to minimize burning or damage to the waterproof and moisture permeable fabric (e.g., composite moisture impermeable layer) during hot stamping. In one example, the thickness for the nonwoven fabrics attached to the two sides of PE or TPU are different to facilitate damage free coupling. For instance, the nonwoven component layer used on the exterior (support strut) side of the draining construction wrap is thick (e.g., 5 mm) relative to the inner nonwoven component layer (e.g., less than 5 mm) to isolate the moisture impermeable component layer from the bonding heat while minimizing the overall thickness of the draining construction wrap.

In another example, foamed polymers for the elastic protrusions (e.g., support struts) are applied through direct extruding onto the waterproof and moisture permeable fabric. The foamed polymer as the elastic protrusions, once extruded, is cooled with the pliable moisture impermeable layer (or permeable layer if the base layer or an overlying layer) to set the protrusions on the one or more layers.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
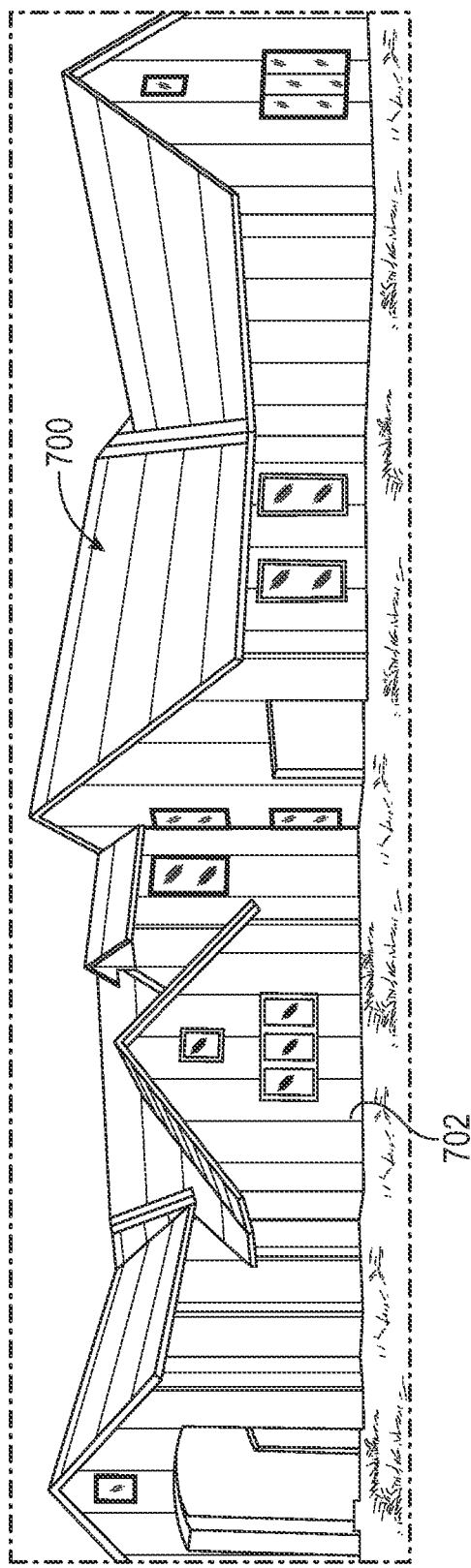
FIG. 1 is a perspective view of a building enveloped with a draining construction wrap.

FIG. 1 is a perspective view of a building 700 enveloped with one example of a draining construction wrap 702. The draining construction wrap encloses the building 700 (e.g., a single family residential home, multi-family residential unit, municipal building, office building or the like) from the surrounding environment, for instance, from one or more of natural elements including, but not limited to, moisture, heat, cold or the like. In one example, the draining construction wrap provides a moisture impermeable feature such as a membrane, layer or the like configured to prevent the ingress of moisture from the exterior to the interior of the building, for instance, along and into one or more of plywood sheeting, studs, insulation or other components on the interior of the building 700. The draining construction wrap, in another example, includes one or more features such as a drainage framework further described herein configured to facilitate the collection and diversion of moisture, for instance, passing through an outer wall including, but not limited to, one or more of stucco, mortar and stone, brickwork, shingles, siding, panels or the like toward the interior of the home. Further, the outer wall includes, but is not limited to, one or more of aluminum composite panels, brass, brick, bronze, ceramic, composite materials, copper, fiber cement panels, glass, masonry panels, metal, plastic laminate panels, porcelain, polyvinyl chloride (PVC), recycled polystyrene, rubber, stainless steel, stone, tile, vinyl, wood or the like. The draining construction wrap 702 intercepts moisture (water vapor, liquid water or the like) and collects the water within one or more drain channels. The drainage framework includes one or more struts or the like configured to brace an installation surface and accordingly maintain drain channels in a specified configuration (e.g., for instance, without occlusions, constriction of drain channels, closing of drain channels or the like).

In one example, the draining construction wrap 702 is coupled to the building 700 (e.g., installed over, around or the like). The draining construction wrap 702 is coupled to an exterior surface of the building 700 including, but not limited to, wall panels, roof panels or the like. The draining construction wrap pliably conforms to the contours and shapes of the building 700. For instance, the draining construction wrap is adapted to pliably conform around corners, bends, fenestration openings (e.g., proximate windows and doors of the building 700) while maintaining the moisture resistance of the draining construction wrap 702.

Figure 2B:
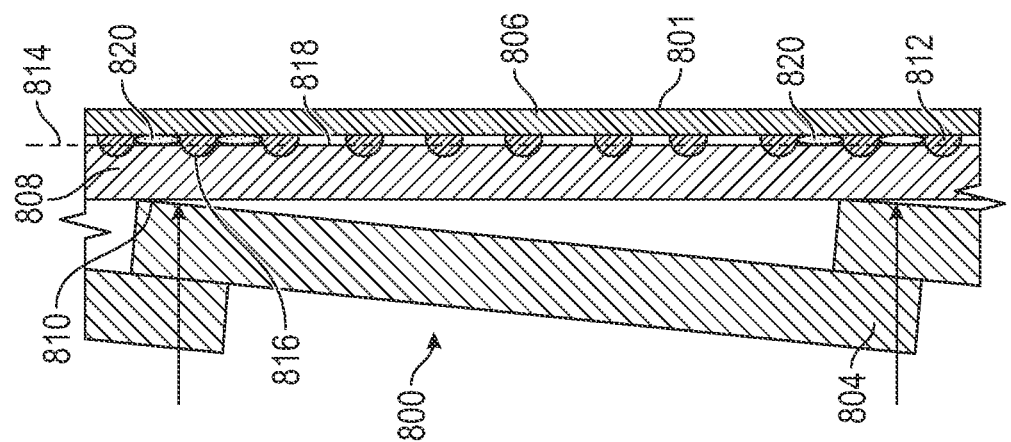
FIG. 2B is a cross sectional view of an assembly of an inner wall and an outer wall with another example of a construction wrap therebetween.
Figure 2A:
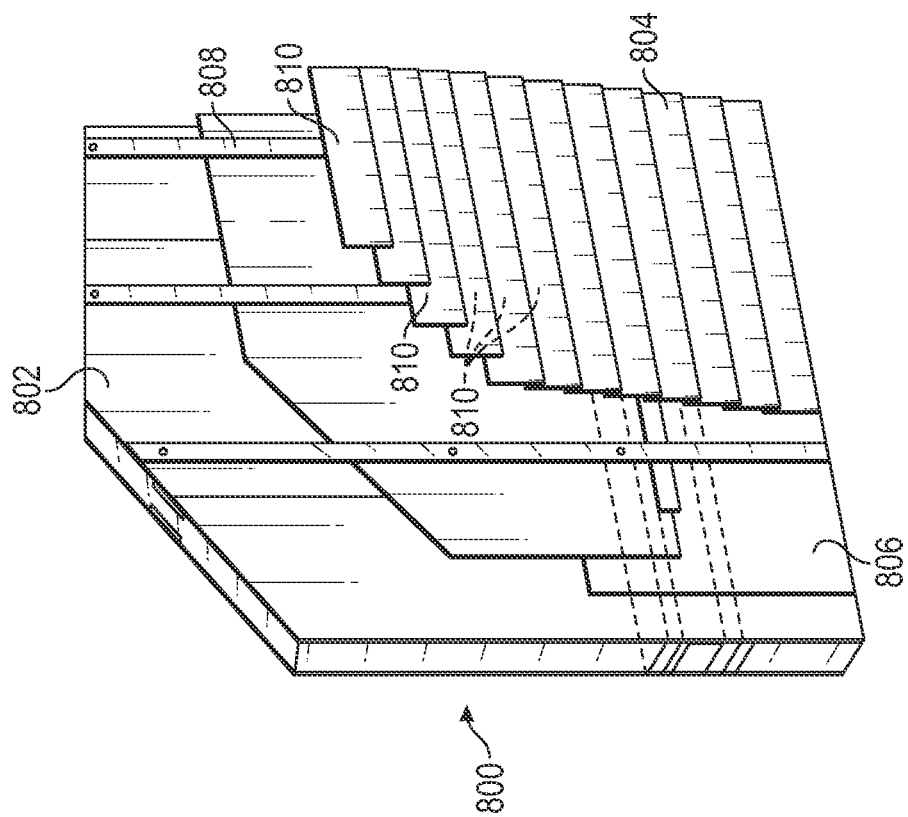
FIG. 2A is a sectional view of an assembly of an inner wall and an outer wall with a construction wrap therebetween.

FIG. 2A shows an example of a sectional view of a wall assembly 800. As shown, the wall assembly 800 provides an exterior to interior view including, for instance, an outer wall 804 and an inner wall 802. In one example, the outer wall 804 includes one or more of siding, panels, shingles, stucco, brick, stone and corresponding mortar provided over the inner wall 802. In the example shown in FIG. 2A, the outer wall 804 includes a plurality of siding panels positioned over the inner wall 802 and coupled thereto. In other examples, furring strips or other components are fastened along the inner wall 802 to facilitate installation of the outer wall 804.

As further shown in FIG. 2A, the inner wall 802 includes a construction wrap 806 applied thereon. The construction wrap 806, in one example, provides moisture resistance to prevent or minimize the ingress of moisture into the interior portions of the building, for instance, into and beyond the inner wall 802. As further shown in the example provided in FIG. 2A, one or more furring strips 808 are provided in an interposing fashion between the construction wrap 806 and the outer wall 804. In one example, the furring strips 808 provide gaps between the outer wall 804 and the construction wrap 806 and the inner wall 802 to facilitate ventilation and drainage of water on the construction wrap 806. The furring strips 808 are, in one example, driven through and fastened to the inner wall 802 with one or more fasteners including, but not limited to, screws, tacks, nails or the like. The outer wall 804 is coupled over the furring strips 808, for instance, with fitting in channels and laying up against the furring strips 808 while indirectly engaging against the inner wall 802 and the construction wrap 806. As described herein, the engagement of the outer wall 804, for instance, at one or more intersections of siding panels or the like creates a locus of engagement 810 with the inner wall 802, for instance along the furring strips 808 and the corresponding portions of the construction wrap 806. As shown in additional views provided herein, the locus of engagement 810 is, in one example, plural loci of engagement 810 corresponding to the interfacing between one or more of a plurality of panels or furring strips 808 and the construction wrap 806. As described herein, the loci of engagement 810, in one example, compress the construction wrap 806 and other features associated with the construction wrap 806 facilitates the retention of moisture and frustrates ventilation. In some examples retention of moisture along the construction wrap 806 facilitates the ingress of the into the inner wall 802 and the interior portions of the building.

FIG. 2B shows a detailed sectional view of one example of a construction wrap 806 provided in a wall assembly 800 similar to the wall assembly 800 previously shown in FIG. 2A. In this example, the construction wrap 806 includes one or more pliable ridges 812 including, for instance, silicone, butyl rubber or the like provided in an elongate fashion along the construction wrap 806. In one example, the pliable ridges 812 are configured to facilitate the drainage of moisture along the construction wrap 806.

As further shown in FIG. 2B, the wall assembly 800 includes the outer wall 804 including a plurality of wall panels engaged in a staggered inter fitting configuration. Where the panels intersect at the locus of engagement 810, a force is applied to the furring strips 808 and correspondingly applied to the pliable ridges 812 (see the directional arrows in FIG. 2B). Additionally, the furring strips 808, as previously described, are driven into and fastened to the inner wall 802. The fastening of the furring strips 808 to the inner wall 802 as well as pressure applied by the outer wall 804, for instance, at one or more loci of engagement 810 compresses the pliable ridges 812. As shown in FIG. 2B, the pliable ridges 812 include ridge apexes 816, for instance, along an upper surface or distal surface of the pliable ridges 812. Forces applied to the pliable ridges by the fastened furring strips 808 or engagement by the outer wall 804 compress the pliable ridges 812 thereby forming a deformation line 814 recessed relative to the specified height for the ridge apexes 816. The deformation line 814 shown, for instance, by a broken line in FIG. 2B indicates the deformation of the pliable ridges 812 and accordingly shows the position of the furring strips 808 in close proximity to the remainder of the construction wrap 806 including, for instance, a moisture impermeable membrane 801. The deformation of the pliable ridges 812 creates one or more pockets between the furring strip 808 and the construction wrap 806 to facilitate the trapping and retention of moisture there along. For instance, as shown in FIG. 2B, trapped moisture 820 is localized, in this example, between the pliable ridges 812 adjacent to one or more of the loci of engagement 810. The deformation of the pliable ridges 812, for instance, to the deformation line 814 provides one or more pockets, recesses or the like that trap moisture.

Additionally, one or more of capillary action, constricted passages such as drainage channels provided between the pliable ridges 812 retains moisture therein and minimizes exposure of the moisture, for instance, to ventilated air passing between the furring strips 808. Accordingly, the moisture, in one example, is retained along the furring strips 808 and between the furring strips 808 and the construction wrap 806. In some examples, trapped moisture 820 is subject to one or more of long term retention, heating and cooling at the loci of engagement 810. Additionally, the trapped moisture 820 is proximate to perforation in the construction wrap 806, for instance from nails, staples or tacks. Accordingly, the trapped moisture 820, in other examples, is subject to one or more of mold, eventual ingress into the building or the like.

In another example, the deformation line 814 corresponding to the deformed pliable ridges 812 forms one or more constricted passages 818 between the pliable ridges 812, the construction wrap 806 and the furring strips 808. As previously described, the constricted passages 818 are, in one example, a constricted channel between the pliable ridges 812 that positions the furring strips 808 in close proximity to the remainder of the construction wrap 806. The constricted passages 818 thereby readily retain trapped moisture 820 therein. In one example, the constricted passages 818 are not localized to the loci of engagement 810 and are instead provided along the length of the construction wrap 806 as shower. The constricted passages 818 accordingly facilitate the trapping of moisture in a manner similar to the trapped moisture 820 along the length of the furring strips 808, for instance, between each of the pliable ridges 812.

Figure 3A:
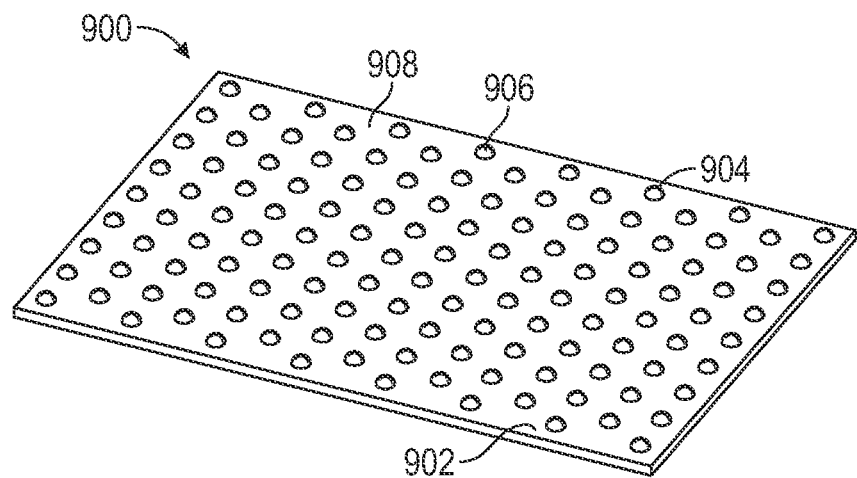
FIG. 3A is a perspective view of one example of a draining construction wrap including a drainage framework.
Figure 3B:
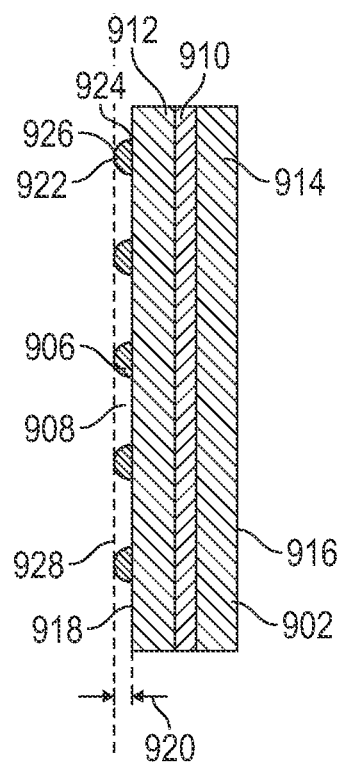
FIG. 3B is a sectional view of the draining construction wrap of FIG. 3A.

FIGS. 3A and 3B show one example of a draining construction wrap 900 including a drainage framework 904 that provides drain promoting features with a structurally braced installation surface. Referring first to FIG. 3A, the draining construction wrap 900 includes a pliable moisture impermeable layer 902, for instance, as a backing or substrate for the drainage framework 904. In one example, the pliable moisture impermeable layer 902 includes one or more component layers as a composite or laminate configured to provide one or more of moisture impermeability, pliability or the like. Optionally, the pliable moisture impermeable layer 902 includes a single layer, for instance, a single layer providing moisture impermeability from the exterior to the interior of the layer 902. In the example shown in FIG. 3B, the layer 902 includes component layers such as a moisture impermeable component layer 910 between a nonwoven component layers 912, 914. In still another example, the moisture impermeable component layer 910 is included with another component layer such as one or more of the nonwoven component layers 912, 914. Optionally, the moisture impermeable layer 902 is moisture impermeable while being gas permeable, for instance to facilitate gas passage and water vapor passage from the interior to the exterior for drying.

Optionally, the nonwoven component layers 912, 914 include one or more of filaments, threading or the like, arranged in a nonwoven matted configuration that provides interstitial spaces configured to receive and coupled with one or more of the support struts 906 shown in FIGS. 3A and 3B. For example, the nonwoven layers 912, 914 coupled with a base strut portion 924 of the struts 906 while the portions 924 are at a glass transition temperature, melting temperature or the like. The material of the base strut portions 924 impregnates or penetrates the nonwoven layers 912 and (when set) bonds the struts 906 to the nonwoven component layer. In still other examples, the base strut portions 924 are coupled with the pliable moisture impermeable layer 902 with adhesives, welds or the like.

Referring again to FIG. 3A, the drainage framework 904 includes a plurality of support struts 906. The support struts 906 in the example shown in FIG. 3A have an upstanding configuration in the manner of a post, peg, projection, boss, or the like (e.g., collectively, strut profiles) extending from the pliable moisture impermeable layer 902 in an outward fashion. Drain channels 908 are provided between each of the support struts 906 to provide unobstructed channels for moisture and ventilation across the pliable moisture impermeable layer 902. In contrast to the construction wrap 806 shown, for instance, in FIG. 2B, the example support struts 906 are provided as discrete components extending from the pliable moisture impermeable layer 902. The pliable ridges 812 shown in FIG. 2B, in one example, extend into and out of the page and accordingly provide elongate lines along the construction wrap 806. As previously described, with deformation of the pliable ridges 812 constricted passages 818 or the like are provided along the construction wrap 806 and accordingly trap moisture there along, minimize ventilation or the like.

Referring again to FIG. 3A, the drainage framework 904, including the support struts 906 and the intervening drain channels 908, provides consistent unobstructed diversion of moisture, for instance, when installed in a vertical or angled configuration such as that shown in FIG. 3B. The support struts 906 are, in one example, constructed with materials such as polymers, foam polymers or the like having a higher Young's modulus relative to the moisture impermeable layer 902. Because the support struts 906 are discrete components, the pliable moisture impermeable layer 902, even with the support struts 906, is configured to readily comply, conform or the like relative to one or more of contours, shapes or the like provided with the building 700. Additionally, the support struts 906 extend from the pliable moisture impermeable layer 902 and are structural components that provide a braced installation surface for the installation of one or more components, such as the outer wall 804 shown in FIG. 2A. As will be described herein, the support struts 906 have a greater rigidity (for instance, greater than butyl rubber or the like) that ensures that engagement with the support struts 906 with one or more of a furring strip, outer wall panels or the like, minimizes deformation of the support struts 906 and accordingly maintains drain channels 908 in an open configuration (e.g., with minimal or no constrictions). Additionally, the drain channels 908 are bounded, in one example, by the bodies of the support struts 906 as well as the pliable moisture impermeable layer 902. Accordingly, intervening components, for instance, of the elongate pliable ridges 812 extending in and out of the page in FIG. 2B are absent in the draining construction wrap 900 of FIGS. 3A, B. Accordingly, the drain channels 908 remain open because of the gaps between the support struts 906 even with deformation of the struts 906, for instance during shock loading with installation of furring strips, outer wall components or the like.

Referring now to FIG. 3B, the draining construction wrap 900 shown in FIG. 3A is shown in a detailed sectional view. As shown, the moisture impermeable component layer 910 is, in this example, sandwiched between the nonwoven component layers 912, 914. The plurality of support struts 906 extend from the nonwoven component layer 912, in this example. In another example, the plurality of support struts 906 extend from other layers, for instance, the moisture impermeable component layer 910.

Referring again to FIG. 3B, as previously discussed, the plurality of support struts 906 extend from an exterior surface 918 of the pliable moisture impermeable layer 902. The support struts 906 include a support body 922 extending from a base strut portion 924 coupled along the pliable moisture impermeable layer 902 to a strut support face 926. In one example, the strut bodies 922 of the plurality of support struts 906 brace the strut support faces 926 at a specified position, for instance, corresponding to a strut gap 920 between the strut support faces 926 and the nonwoven component layer 912 or other exterior surface 918 of the pliable moisture impermeable layer 902. The strut bodies 922 provide a structural component between the pliable moisture impermeable layer 902 that positions the strut support faces 926 at a specified position with minimal deformation (as described herein, to absorb shock loading in examples).

The strut bodies 922 of the support struts 906 statically position the strut support faces 926 in a flush configuration, for instance, corresponding to the installation surface 928 shown in dashed line extending across each of the strut support faces 926. The strut support faces 926 accordingly provide the installation surface 928 in a substantially planar configuration for installation of one or more components of the outer wall including, but not limited to, furring strips, outer wall panels, mortar, stucco or the like. In another example, the installation surface 928 provides a virtual installation surface including each of the strut support faces 926 to facilitate installation of one or more components of the outer wall while maintaining the drain channels 908 between the support struts 906. As shown in FIG. 3B, the strut gap 920 extending from the strut support faces 926 to the exterior surface 918 is substantially static and accordingly the installation surface 928 is substantially static to facilitate the installation of the outer wall along the structurally supported installation surface 928 in a specified orientation (e.g., vertically and without bowing, warping or the like).

As previously described herein, the drainage framework 904 including the support struts 906 is a structural component that provides a braced installation surface 928 for outer wall components while maintaining the drain channels 908 in a restriction free (including constriction free) configuration. In one example, the support struts 906 are structural components that also permit limited deformation to absorb shock loading that otherwise causes damage to the outer wall components or components of a wall assembly. For instance, during installation of one or more of furring strips, outer wall components such as shingles, siding, panels, brick and mortar or the like shock loads are transmitted to the draining construction wrap 900, the inner wall 802 and any components coupled there along. In some examples, shock loads if not absorbed cause damage to components including brittle components, such as brick, stone, siding panels or the like. Optionally, porous cells (e.g., filled with ambient air) in foam or reticulated support struts 906 facilitate limited deformation of the struts during installation, and accordingly absorb forces that otherwise damage the outer wall (e.g., including brittle cement panels or the like).

As previously described herein, in some examples, the support struts 906, while having a greater rigidity than the pliable moisture impermeable layer 902, allow for some amount of deformation, for instance, during installation of one or more of wall components, such as furring strips, brick and mortar, stone, vinyl siding, shingles, panels or the like. In one example, the plurality of support struts 906 are configured to provide a limited amount of deformation during shock loading to facilitate the coupling of one or more of these features without damaging the brittle or sensitive components. The deformation of the support struts 906 cushions the shock loading of these components and accordingly facilitates the installation of these components without damage (e.g., compressive cracking, fracture or the like). Instead, the support struts 906 that brace the installation surface 928 also deformably support the outer wall components during installation. The support struts 906 intimately couple with the outer wall components, and bias back into their original configuration, for instance, that shown in FIG. 3B, having the braced installation surface 928 and consistent drain channels 908.

Figure 4A:
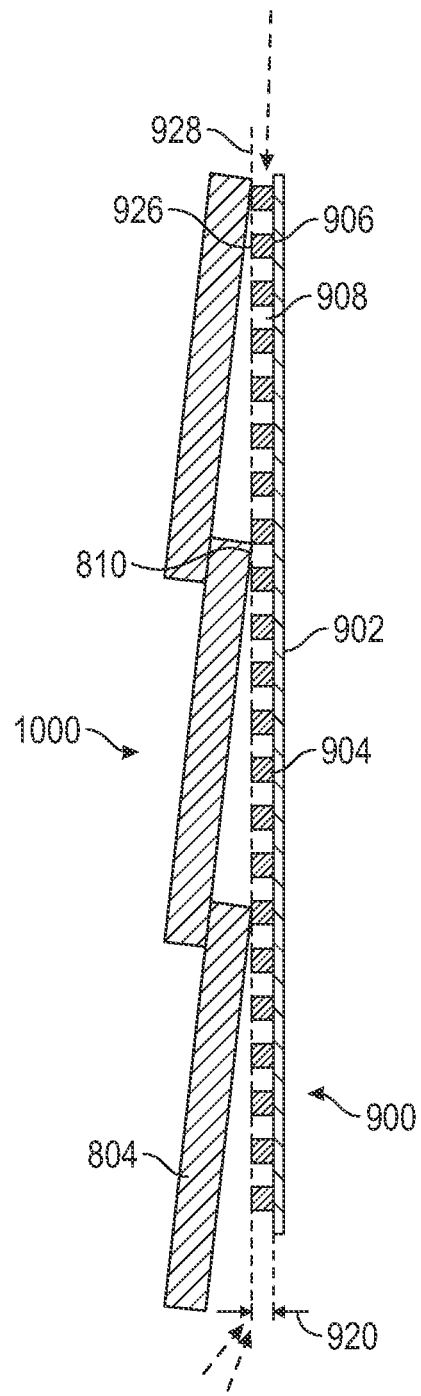
FIG. 4A is a cross sectional view of the draining construction wrap of FIG. 3 installed between an inner wall and an outer wall.
Figure 4B:
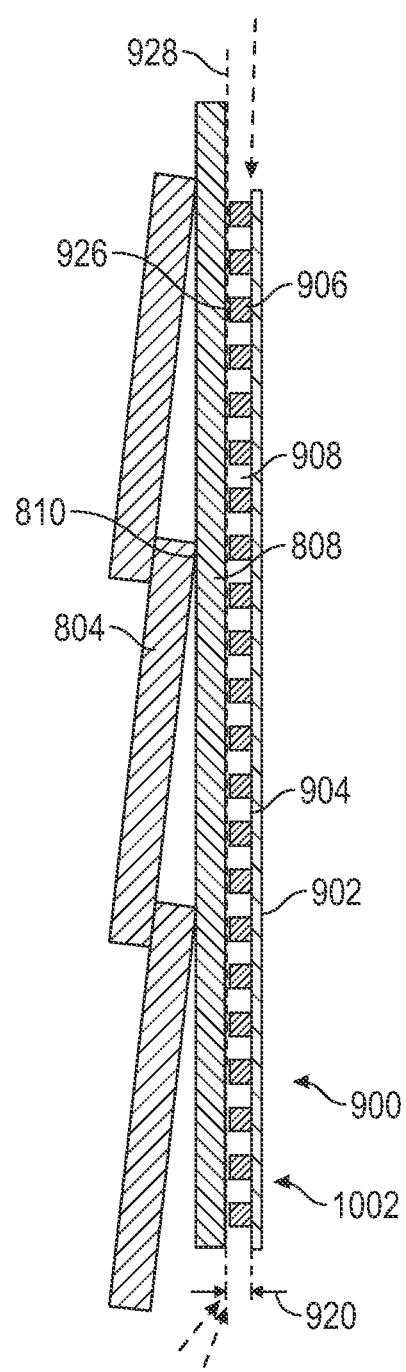
FIG. 4B is a cross sectional view of the draining construction wrap of FIG. 3 installed between an inner wall and an outer wall with a furring strip.

FIGS. 4A and 4B show examples of wall assemblies 1000, 1002, respectively, including outer walls 804, with the draining construction wrap 900 previously described and shown, for instance, in FIGS. 3A, 3B. Referring first to FIG. 4A, the draining construction wrap 900 is shown in an installed configuration engaged directly with the outer wall 804, for instance, in this example, a plurality of siding pieces or panels including one or more of cement siding. In the example shown in FIG. 4A, the draining construction wrap 900 includes a plurality of support struts 906 extending to strut support faces 926. The strut support faces 926, in turn, are part of the installation surface 928, for instance, a substantially planar installation surface to facilitate the coupling of one or more of the outer wall components 804 along the inner wall (802 as shown in FIG. 2A). The installation surface 928 provides a planar contour, and ensures the outer wall 804 coupled there along has a specified appearance (e.g., planar and without bowing, depressions or the like).

As shown, the drainage framework 904 includes the plurality of support struts 906 and the drain channels 908 therebetween. The support struts 906 brace the installation surface 928, for instance, at the specified position relative to the pliable moisture impermeable layer 902 corresponding to the strut gap 920. The drain channels 908 of the drainage framework 904 are maintained between the support struts 906 without constriction or appreciable deformation of the support struts 906 (e.g., while optionally allowing limited deformation as described herein). Additionally, as shown in FIG. 4A, one or more of loci of engagement 810, for instance, at the interfaces between component panels of the outer wall 804, do not significantly compress the support struts 906, and accordingly the drain channels 908 are maintained in an open configuration and are bounded by the support struts 906 and the pliable moisture impermeable layer 902 coupled with the support struts 906. Accordingly, pliable ridges or other components of other construction wraps do not interrupt, constrict or otherwise retain moisture at the loci of engagement 810. Instead, moisture is readily diverted through the support struts 906, for instance, along the drain channels 908 in a downward direction by gravity (shown with the downward dashed arrow in FIG. 4A). Additionally, (as shown with the upward turned dashed arrows in FIG. 4A), ventilation is facilitated through the wall assembly 1000, for instance, between the support struts 906 and along the drain channels 908 because of the maintenance of the drain channels 908 through the support struts 906. Accordingly, even with forces such as engagement forces, weight, moment or the like applied at the loci of engagement 410 by the outer wall 804 (including one or more of cement panels, metal panels, glass or the like), the drain channels 908 are maintained without restriction thereby facilitating the drainage and ventilation along the draining construction wrap 900.

FIG. 4B shows another example of a wall assembly 1002 including the outer wall 804 coupled along the draining construction wrap 900. In this example, a plurality of furring strips 808 are coupled along the pliable moisture impermeable layer 902 and interposed between the layer 902 and the outer wall 804. In this configuration, the loci of engagement 810, in one example, corresponds to the interface between one or more of the component panels of the outer wall 804. As shown, the furring strips 808 are installed along the installation surface 928 and the drain channels 908 are maintained between the outer wall 804 and the pliable moisture impermeable layer 902. As previously described, the support struts 906 brace the strut support faces 926 and the corresponding installation surface 928 at a position corresponding to the strut gap 920. Deformation of the support struts 906 is, in most examples, limited to deformation of the support struts during installation of the furring strips, for instance, by way of driving of nails, fasteners or the like and corresponding shock loading of the support struts 906. The deformation of the support struts 906 cushions the installation of each of the outer wall 804 and the furring strips 808 and accordingly minimizes any damage to either of the furring strips 808 or the outer wall components, such as brittle components. Localized deformation of the support struts 906 restored after installation, and the support struts 906 assume a near previous configuration spacing the installation surface 928 by the strut gap 920. Ventilation and draining are shown, in one example in FIG. 4B, with the dashed arrows at the top and bottom of the wall assembly 1002, respectively.

The draining construction wrap 900 shown in FIGS. 4A, 4B is in one example applied on site to a building, such as building 700. In another example, the draining construction wrap 900 is applied as a component of a prefabricated component, such as a wall panel. For instance, the draining construction wrap 900 is bonded with prefabricated boards, panels or the like at a factory, manufacturing location, job site or the like prior to installation. For instance, the draining construction wraps described herein are laminated, adhered, welded, fastened or the like to oriented strand board (OSB), plywood, fiberboard, foam board or the like. In still other examples, the draining construction wrap 900 described herein is applied to the building 700 after assembly of the panels (e.g., the draining construction wrap is unrolled along the building 700) and fastened or adhered in place.

Figure 5A:
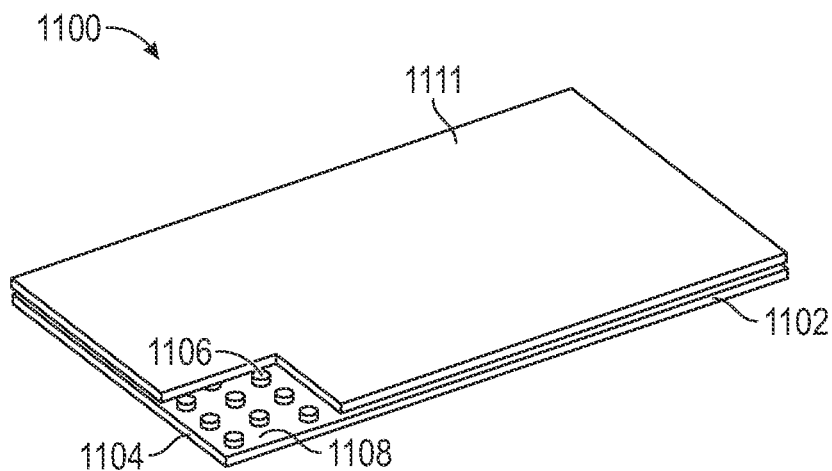
FIG. 5A is a perspective view of another example of a draining construction wrap including a drainage framework.

FIG. 5A shows another example of a draining construction wrap 1100. In the example shown, the draining construction wrap 1100 includes a drainage framework 1104 coupled with a pliable moisture impermeable layer 1102. As previously described, the pliable moisture impermeable layer 1102, in some examples, is a single layer and, in other examples, includes one or more component layers, for instance, a composite, laminate or the like.

As further shown in FIG. 5A, the draining construction wrap 1100, in this example, includes a pliable moisture permeable layer 1111, for instance, a porous nonwoven layer or the like coupled with the drainage framework 1104. In one example, the pliable moisture permeable layer 1111 cooperates with the support struts 1106 of the drainage framework 1104 to provide a continuous installation surface 1128 (see FIG. 5B) along each of the support struts 1106 and between the struts 1106 with the pliable moisture permeable layer 1111. In some examples, the pliable moisture permeable layer 1111 is used with outer wall components including, but not limited to, one or more of stucco, mortar or the like. The stucco or mortar, when applied in a liquid configuration, partially penetrates or impregnates the pliable moisture permeable layer 1111 and provides an intimate engagement and coupling between the outer wall and the draining construction wrap 1100 without infiltrating the drain channels 1108 between the support struts 1106. Additionally, in operation, the pliable moisture permeable layer 1111 facilitates the ingress of moisture, for instance, to the drain channels 1108 between the support struts 1106 to facilitate drainage and ventilation along the drainage framework 1104.

Referring again to FIG. 5A, as previously described, the drainage framework 1104 includes the support struts 1106 as well as the drain channels 1108 therebetween. In a manner similar to the draining construction wrap 900 previously described herein, the support struts 1106 have a greater rigidity than the corresponding rigidity of the pliable moisture impermeable layer 1102. Accordingly, the pliable moisture impermeable layer 1102 provides a flexible substrate for the support struts 1106. The support struts 1106 are discrete components from one another, and the layer 1102 readily deflects and conforms to the contours of a building while providing the bracing support struts thereon.

Figure 5B:
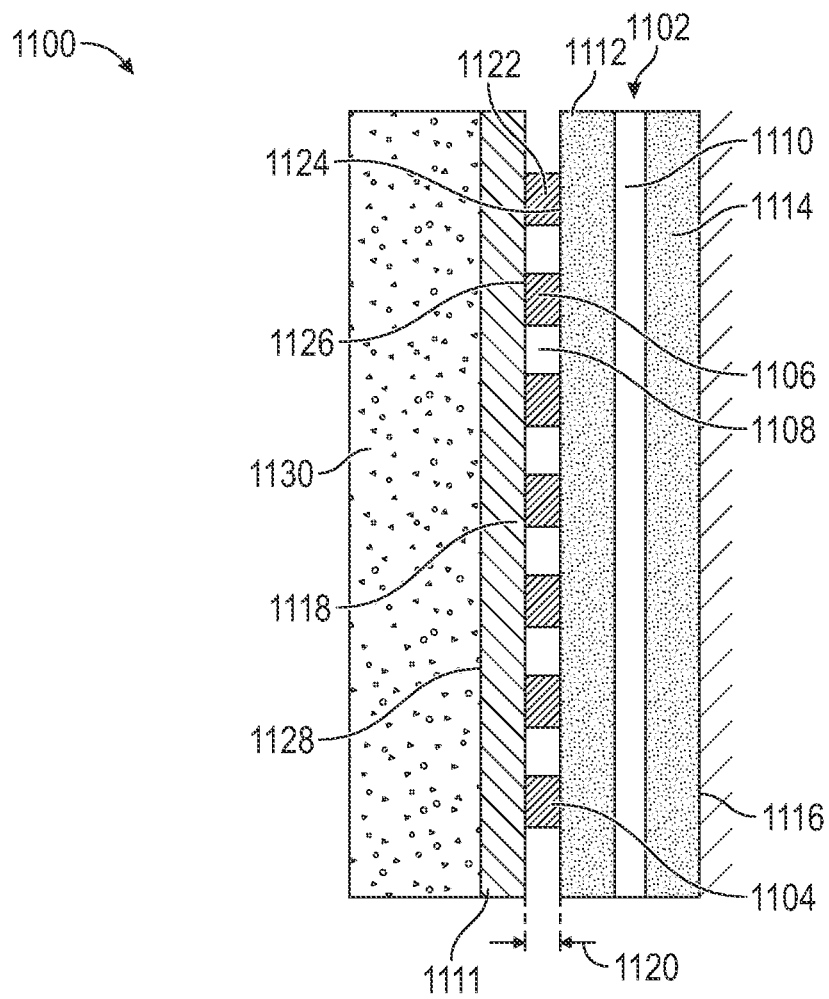
FIG. 5B is a sectional view of the draining construction wrap of FIG. 5A.

Additionally, the support struts 1106, having a higher Young's modulus or the like relative to the pliable moisture impermeable layer 1102, provide structural support to maintain the installation surface, such as the surface 1128 shown in FIG. 5B, at a specified position corresponding to the strut gap 1120. The support struts 1106 maintain the drain channels 1108 even with the installation of outer walls that, in other examples, may deform other components of other construction wraps such as the pliable ridges shown, for instance, in FIG. 2B. In contrast to the deformed pliable ridges, the support struts 1106 maintain a consistent (static or near static) configuration and accordingly maintain the strut gap 1120 after installation of the outer wall along the draining construction wrap 1100. The drain channels 1108 thereby avoid constrictions, occlusion or the like present in other construction wraps and corresponding trapping of water, capillary action to trap moisture or the like.

Referring now to FIG. 5B, the draining construction wrap 1100 is shown in an installed configuration, for instance, with an outer wall 1130 coupled with the wrap, and the wrap is coupled along an inner wall 1113. In the example shown in FIG. 5B, the outer wall 1130 includes one or more component materials such as stucco, mortar or the like applied along the pliable moisture permeable layer 1111. The support struts 1106 are provided along an exterior surface 1118 of the draining construction wrap 1100 while the remainder of the draining construction wrap, for instance, on an opposed surface of the pliable moisture impermeable layer 1102, is provided along an interior surface 1116. Optionally, the draining construction wrap 1100 is included as a component of the inner wall 1113. For instance, the pliable moisture impermeable layer of the draining construction wrap 1100 is bonded (e.g., laminated, adhered, welded, fastened or the like) to the inner wall 1113 prior to installation of the inner wall 1113 to a building, frame or the like.

As further shown in FIG. 5B, the draining construction wrap 1100, in this example, includes a component construction of the pliable moisture impermeable layer 1102. For instance, the layer 1102 includes component layers, such as a moisture impermeable component layer 1110 and one or more nonwoven component layers 1112, 1114. In the example shown in FIG. 5B, the moisture impermeable component layer 1110 is sandwiched or interposed between the nonwoven layers 1112, 1114. In other examples, the moisture impermeable component layer 1110 is coupled with one or more other component layers, for instance, one of the nonwoven component layers 1112, 1114.

As further shown in FIG. 5B, the plurality of support struts 1106 extend between the pliable moisture impermeable layer 1102 and the pliable moisture permeable layer 1111. For instance, the plurality of support struts 1106 include strut bodies 1122 extending between base strut portions 1124 coupled with the pliable moisture impermeable layer 1102 and strut support faces 1126 coupled with the pliable moisture permeable layer 1111. The support struts bridge between the pliable moisture permeable layer 1111 and the pliable moisture impermeable layer 1110 and space the permeable layer 1111 at a consistent distance from the impermeable layer 1110.

Referring again to FIG. 5B, as previously described, the support struts 1106 of the drainage framework 1104 are interposed, in this example, between the pliable moisture permeable layer 1111 and the pliable moisture impermeable layer 1102. The plurality of support struts 1106 provide an installation surface 1128 spaced relative to the pliable moisture impermeable layer 1102 and configured to provide a consistent series of drain channels 1108 therebetween. The drain channels 1108, in the example shown in FIG. 5B, and in a similar manner to the previously described example, includes drain channels 1108 bounded by the support struts 1106 as well as the pliable moisture impermeable layer 1102 and, in this example, the pliable moisture permeable layer 1111. Accordingly, intervening portions of pliable ridges or the like are not interposed between the support struts 1106. Accordingly, deformation, even limited deformation, of the strut bodies 1122 fails to preclude or constrict the drain channels 1108 instead, the drain channels 1108 are consistently maintained with a height corresponding to the strut gap 1120, shown in FIG. 5B, corresponding to the length of the strut bodies 1122 between the base strut portions 1124 and the strut support faces 1126.

With the plurality of support struts 1106 forming the drainage framework 1104 the strut support faces 1126 and the pliable moisture permeable layer 1111 consistently provide the installation surface 1128 in a spaced position relative to the pliable moisture impermeable layer 1102. Accordingly, the drain channels 1108 are maintained and a continuous substantially planar surface is provided for the installation of the outer wall 1130. As shown in FIG. 5B, the strut support faces 1126 provide a substantially planar continuous surface for installation of the outer wall 1130 (e.g., one or more of mortar, stucco or the like) there along. Additionally, the pliable moisture permeable layer 1111 spanning each of the strut support faces 1126 continues the installation surface 1128 and provides a porous substrate for penetration and capture of the liquid outer wall material therealong. Even with the penetration of the outer wall 1130 into the pliable moisture permeable layer 1111 further penetration is substantially arrested by the porous layer. The drain channels 1108 of the drainage framework 1104 are accordingly maintained and one or more of ventilation, moisture drainage or the like continues in the draining construction wrap 1100 even when coupled with the outer wall 1130.

Figure 6A:
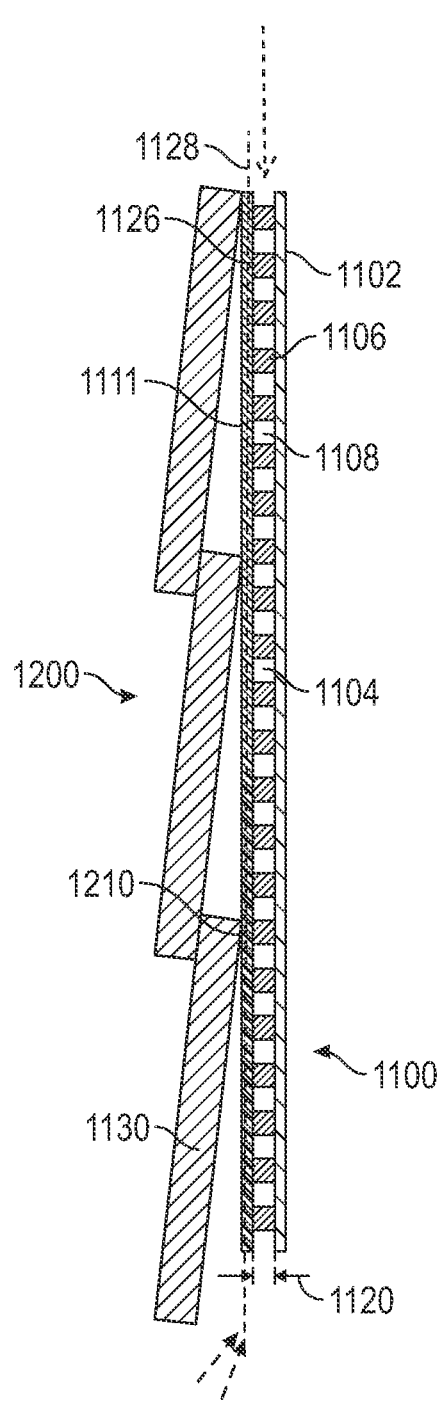
FIG. 6A is a cross sectional view of the draining construction wrap of FIG. 5A installed between an inner wall and an outer wall.
Figure 6B:
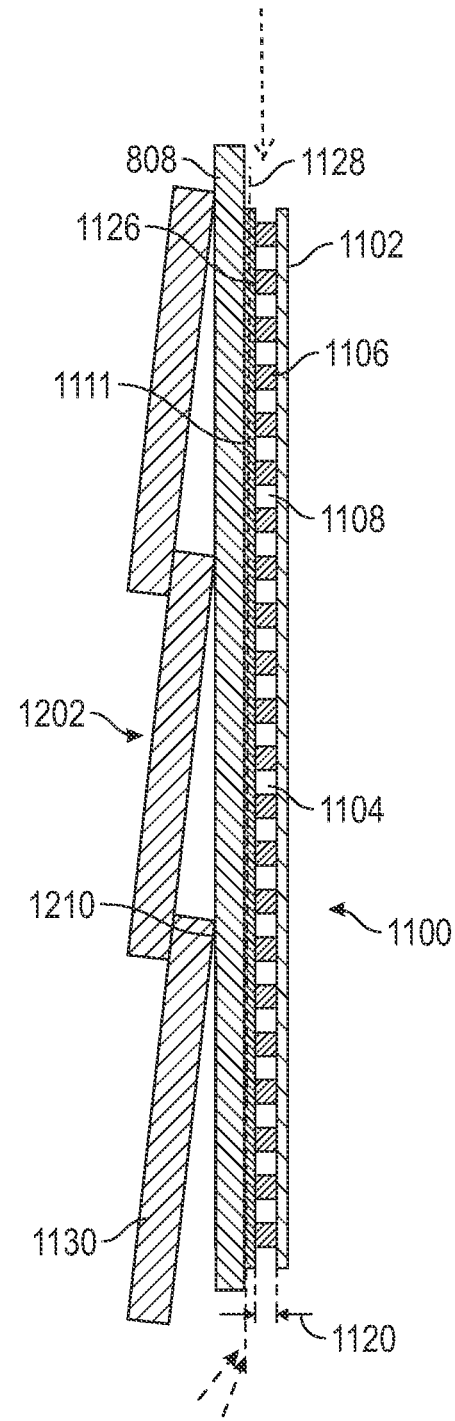
FIG. 6B is a cross sectional view of the draining construction wrap of FIG. 5A installed between an inner wall and an outer wall with a furring strip.

FIGS. 6A and 6B show examples of wall assemblies 1200, 1202 including, for instance, an outer wall 1130 installed along an installation surface 1128 of the draining construction wrap 1100. An additional component, such as an inner wall (shown in FIG. 2A) is provided along the opposed or interior surface of the draining construction wrap 1100 in each of these examples.

Referring first to FIG. 6A, the wall assembly 1200 is shown with an outer wall 1130 including, for instance, one or more outer wall panels such as shingles, siding or the like engaged along the installation surface 1128. As previously described and shown again in FIG. 6A, the installation surface 1128 is substantially planar, for instance, having a continuous planar configuration along the strut support faces 1126. As previously described, the strut support faces 1126 of the support struts 1106 are braced in the position shown, for instance, with the corresponding strut gap 1120 between the pliable moisture impermeable layer 1102 and the pliable moisture permeable layer 1111. The strut support faces 1126 provide a structural surface for installation of one or more features, such as features of the outer wall 1130 there along. The drainage framework 1104, including the support struts 1106, further includes drain channels 1108 between each of the support struts 1106. The drain channels 1108 are maintained even with loading of the draining construction wrap 1100, for instance, with application of the outer wall 1130 nailing, fastening or the like driven through the outer wall 1130 or the application of heavier materials, for instance, one or more of stucco, mortar, stone, brick or the like. For instance, at one or more loci of engagement 1210 apply force along the installation surface 1128 to the underlying support struts 1106. The force, and corresponding compression, are resisted according to the structural configuration of the support struts 1106 with a greater rigidity than the pliable moisture impermeable layer 1102. Optionally, the support struts 1106 permit limited deformation to absorb loads, such as shock loads, and then return to substantially the configuration shown in FIG. 6A (e.g., with the specified strut gap 112). The support struts 1106 accordingly maintain the drain channels 1108 and the drainage framework 1104 along the draining construction wrap 1100 to facilitate one or more of draining (shown with a downward dashed arrow) or ventilation (shown with the upward dashed arrows).

As further shown in FIG. 6A, in this example the installation surface 1128 further includes a pliable moisture permeable layer 1111 as previously shown in FIGS. 5A, 5B. In this example, the pliable moisture permeable layer 1111 facilitates increased ventilation of the draining construction wrap 1100 while providing a porous barrier between the outer wall 1130 and the drainage framework 1104. For instance, the pliable moisture permeable layer 1111, such as a perforated polymer, nonwoven or the like, facilitates ventilation through the layer 1111 while at the same time preventing the ingress of particulate, dust, pollen or the like. Additionally, moisture readily passes through the pliable moisture permeable layer 1111 into the drain channels 1108 for diversion, for instance, toward the bottom of the draining construction wrap 1100.

Referring now to FIG. 6B, another example wall assembly 1202 is shown. In this example, furring strips 808 are provided as an interposing feature between the remainder of the outer wall 1130 and the draining construction wrap 1100. The furring strips 808 are, in one example, driven into the inner wall, for instance, through the draining construction wrap 1100 to accordingly fasten the furring strips 808 in place and thereafter allow for installation of the outer wall 1130 thereon. As previously described in some examples, loci of engagement 1210 are applied to the draining construction wrap 1100 corresponding to the fastening or applied force of the furring strips 808 to the draining construction wrap 1100. Because of the structural configuration of the support struts 1106, the installation surface 1128 remains substantially planar (e.g., with limited deformation at installation of the strips 808) and accordingly the drain channels 1108 are maintained, for instance, without one or more of occlusions, constrictions or the like. Instead, drainage is allowed through the drain channels 1108 even behind the furring strips 808 along the inner wall of the building.

Optionally, the support struts 1106 allow for some limited deformation, for instance, with shock loading of the furring strips 808 during hammering, nailing, fastening or the like. The support strips 1106 readily return to their original or near original configuration, and thereby maintain the strut gap 1120 and the drain channels 1108. As with the previous example shown, for instance, in FIG. 6A, the pliable moisture permeable layer 1111 is included to facilitate the ingress and draining of moisture while minimizing ingress of particulate, such as pollen, dust or the like. Accordingly, in this example, the pliable moisture permeable layer 1111 (as well as in the example in FIG. 6A) facilitates the ingress of moisture and ventilation to the draining construction wrap 1100 while preventing the ingress of other particulate such as dust, pollen or the like into the drain channels 1108.

In another example, the draining construction wrap 1100 is coupled with panels used in the construction of the building 700. For instance, the draining construction wrap 1100 is bonded with prefabricated boards, panels or the like at a factory, manufacturing location, job site or the like prior to installation. For instance, the draining construction wrap described herein is laminated, adhered, welded, fastened or the like to oriented strand board (OSB), plywood, fiberboard, foam board or the like. In still other examples, the draining construction wrap 1100 described herein is applied to the building 700 after assembly of the panels (e.g., the draining construction wrap is unrolled along the building 700) and fastened or adhered in place.

FIGS. 7A-7D show various examples of draining construction wrap 1300, 1302, 1304, 1306 including support struts having various profiles (e.g., strut profiles). The strut profiles described herein include one or more of shape, length, width, circumference or the like of the support struts and the corresponding overall support surface provided by the support struts, for instance, corresponding to the installation surfaces described herein such as the installation surfaces shown in FIGS. 3B; 4A, B; 5B; and 6A, B.

Figure 7A:
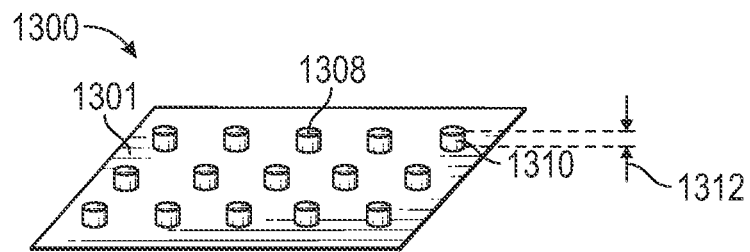
FIGS. 7A-D Strut profile examples. Circular, ovular, square, rectangle, diamond, triangle.

Referring first to FIG. 7A, the draining construction wrap 1300 includes a plurality of support struts 1308 having corresponding strut profiles 1310. The strut profiles 1310 are, in this example, in a post configuration. For instance, the struts 1308 are round columns extending from their base portions to strut support faces configured to provide an installation surface. As further shown in FIG. 7A, the plurality of support struts 1308 are coupled with a pliable layer 1301, such as one or more of the pliable moisture impermeable or pliable moisture permeable layers described herein. In another example, the plurality of support struts 1308 bridge between pliable moisture impermeable and pliable moisture permeable layers as described herein. For ease of illustration the second layer is withheld in each of FIGS. 7A-D.

The support struts 1308 provide a flush installation surface for installation of one or more components of an outer wall assembly. In the view shown in FIG. 7A, the support struts 1308, having the strut profile 1310, provide a discontinuous surface having a continuous planar configuration. The installation surface is substantially continuous extending across the tops of each of the support struts 1308 while providing the drain channels (and discontinuities) therebetween.

Figure 7B:
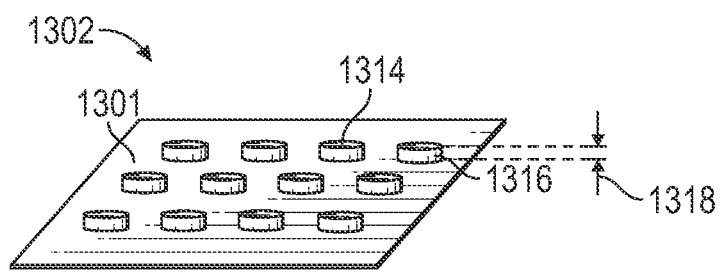

FIG. 7B shows another example of a draining construction wrap 1302 including support struts 1314 coupled with a pliable layer 1301 (e.g., one or more of the pliable moisture impermeable or pliable moisture permeable layers). In the example shown, the draining construction wrap 1302 includes the support struts 1314 having strut profiles 1316. In this example, the strut profiles 1316 are substantially ovular relative to the circular profiles of the support struts 1308 shown in FIG. 7A. Additionally, the strut length 1318 of the support struts 1314 (corresponding to the strut gaps described herein) is smaller with the support struts 1314 relative to the strut lengths 1312 of the support struts 1308 shown in FIG. 7A. Additionally, as shown in FIG. 7B, the support struts 1314 provide distributed support faces (a larger surface area) relative to the support struts 1308 according to the strut profiles 1316. Additionally, the support struts 1314, having the ovular configuration shown in FIG. 7B and circular configuration in FIG. 7A, are configured to divert moisture, for instance, liquid water, along their surfaces in substantially any orientation.

Figure 7C:
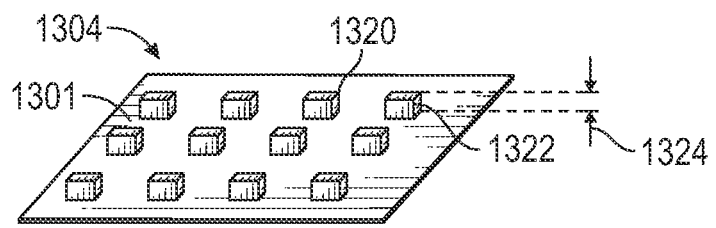

FIG. 7C shows another example of a draining construction wrap 1304, including a plurality of support struts 1320 extending from a pliable layer 1301. In this example, the support struts 1320 have a differing strut profile 1322 relative to either of the strut profiles 1310, 1316 previously described herein. The support struts 1320 include a rectangular or square strut profile 1322. Additionally, the strut lengths 1324 corresponding to the strut gaps previously described herein are different for the support struts 1320 relative to the strut length 1312 of the support struts 1308. For instance, the strut lengths 1324, as shown in FIG. 7C are, in one example, smaller relative to the strut lengths 1312 shown in FIG. 7A. In the example shown in FIG. 7C the strut profile 1322 is one or more of a rectangle, square or the like. Optionally, the strut profile 1322 is, in one example, provided in a rotated configuration relative to horizonal. For instance, the strut profiles 1322 are arranged in a diamond pattern or rotated 45 degree or the like to orient one or more of the surfaces of the strut profile 1322 into an angled orientation relative to horizontal to ensure diversion of moisture along the support struts 1320.

Figure 7D:
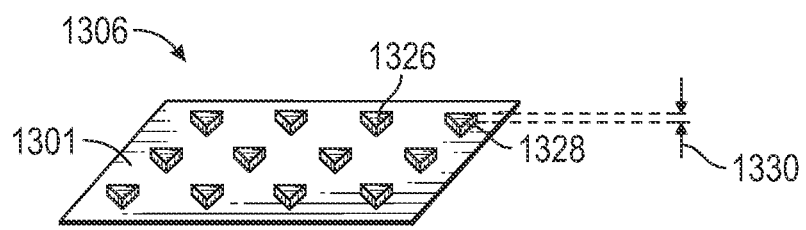

FIG. 7D shows another example of a draining construction wrap 1306 including support struts 1326 having strut profiles 1328 that are triangular. As shown, the support struts 1326 include a strut length 1330 (as part of the strut profile 1328) shorter compared to the other strut lengths 1312, 1318, 1324 shown in FIGS. 7A-C. In various examples, the strut lengths 1330 are provided in one or more specified dimensions, for instance, from 5 millimeters to 65 millimeters. In the various examples described and shown herein, the support struts 1308, 1314, 1320, 1326, as well as the other examples of support struts described herein have varied profiles including combinations of shape, length, perimeter or the like to provide a consistent flush series of strut support faces as installation surfaces. The installation surface provides a planar surface configured to support one or more components installed over the corresponding construction wraps. As described herein, the support struts brace the strut support faces and ensure the outer wall components are adequately supported to prevent chronic deformation, shrinking or the like of the support struts and corresponding occlusion, constriction or the like of drain channels extending between the support struts.

Figure 8A:
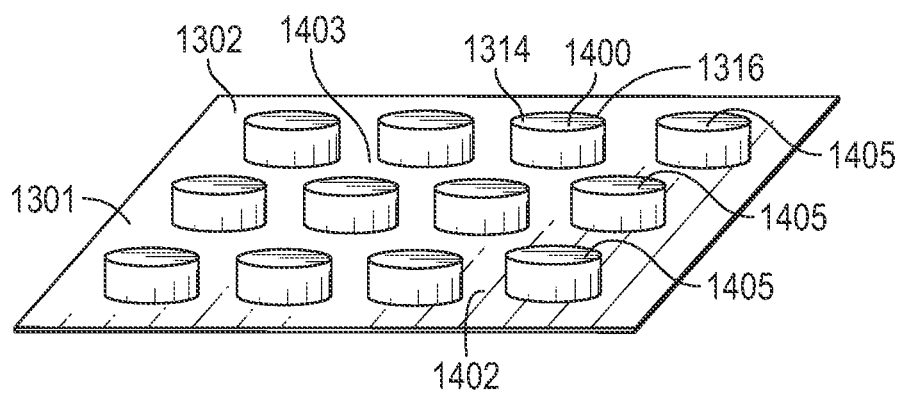
FIG. 8A-B Strut arrangements relative to drain channels. For various sizes of struts and corresponding SA ratios.
Figure 8B:
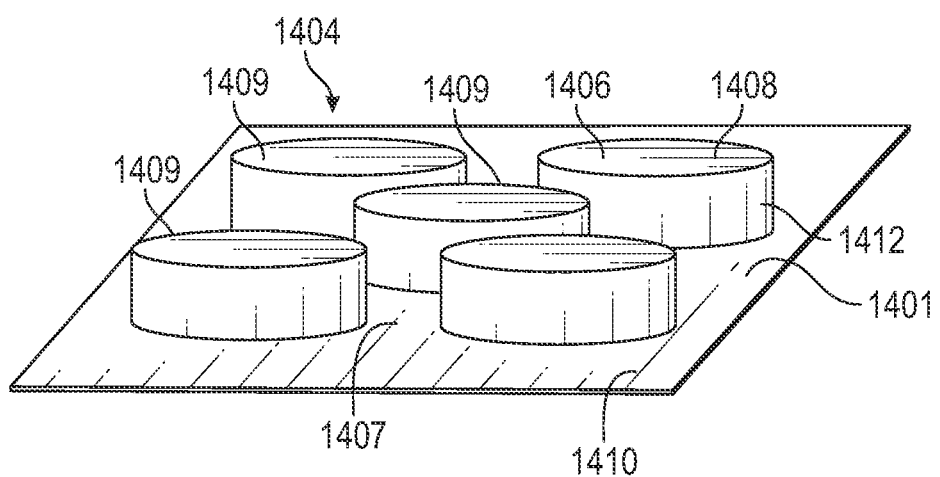

Referring now to FIGS. 8A and 8B, examples of construction wraps such as draining construction wraps 1302, 1404 are shown. The strut profiles 1316, 1412 of the draining construction wraps 1302, 1404 provide varying coverage surface of the support struts and the intervening drain channels along the pliable layers 1301, 1401.

Referring first to FIG. 8A, the draining construction wrap 1302 includes a plurality of support struts 1314 that provide a drainage frame work. In the example shown in FIG. 8A, the support struts 1314 have a post strut profile 1316 extending away from the pliable layer 1301. As further shown in FIG. 8A, drain channels 1403 extend between each of the support struts 1314.

As shown in FIG. 8A, each of the support struts 1314 includes a component strut coverage area 1400 corresponding to a surface area or a strut support face area of each of the struts 1314. A composite strut coverage area 1405 includes the areas 1400 of each of the support struts 1314 included together relative to a channel coverage area 1402 of the drain channels 1403. The channel coverage area 1402 is the surface area between each of the support struts 1314 (the drain channels 1403) and extending along the pliable layer 1301. In the example shown in FIG. 8A, the composite strut coverage area 1405 is less than the channel coverage area 1402. The larger channel coverage area 1402 relative to the strut coverage area 1400 facilitates the draining of fluids between each of the support struts 1314 while at the same time continuing to provide an installation surface, for instance, along the strut support faces (as described herein) sufficient to support and brace the strut support faces and thereby provide an installation surface having a planar configuration for mounting of outer wall components.

Referring now to FIG. 8B, another example of the draining construction wrap 1404 is provided. In this example, the support struts 1406 having a relatively larger strut profile 1412 relative to the strut profile 1316 shown in FIG. 8A. The support struts 1406 extend from the pliable layer 1401 including, but not limited to, one or more of the pliable moisture impermeable layers or pliable moisture permeable layers described herein. Optionally, the support struts 1406 bridge between layers, such as a pliable moisture impermeable layer and a pliable moisture permeable layer as previous described.

In this example, the support struts 1406 include strut coverage areas 1408 larger than the strut coverage areas 1400 of the struts 1314 shown in FIG. 8A. Additionally, in this example, the support struts 1406 are provided in a more tightly packed, higher density configuration relative to the less dense configuration shown elsewhere herein. The corresponding composite strut coverage area 1409 of the support struts 1406 in FIG. 8B is collectively greater than the composite strut coverage area 1405 in FIG. 8A. In this example, the composite strut coverage area 1409 is greater than the channel coverage area 1410 of the drain channels 1407 between the support struts 1406. With this configuration, the support struts 1406 provide a near continuous installation surface including, for instance, a planar installation surface distributed across the pliable layer 1401. In one example, the support struts 1406 having the larger strut profiles 1412 and corresponding overall larger composite strut coverage area 1409 provides additional bracing for the draining construction wrap 1404 to accordingly carry larger loads and and provide enhanced resistance to deformation. In another example, the packing density of the support struts 1406 is decreased to space the support struts 1406 relative to each other and increase the channel coverage area 1410 to facilitate additional ventilation and moisture drainage.

Figure 9:
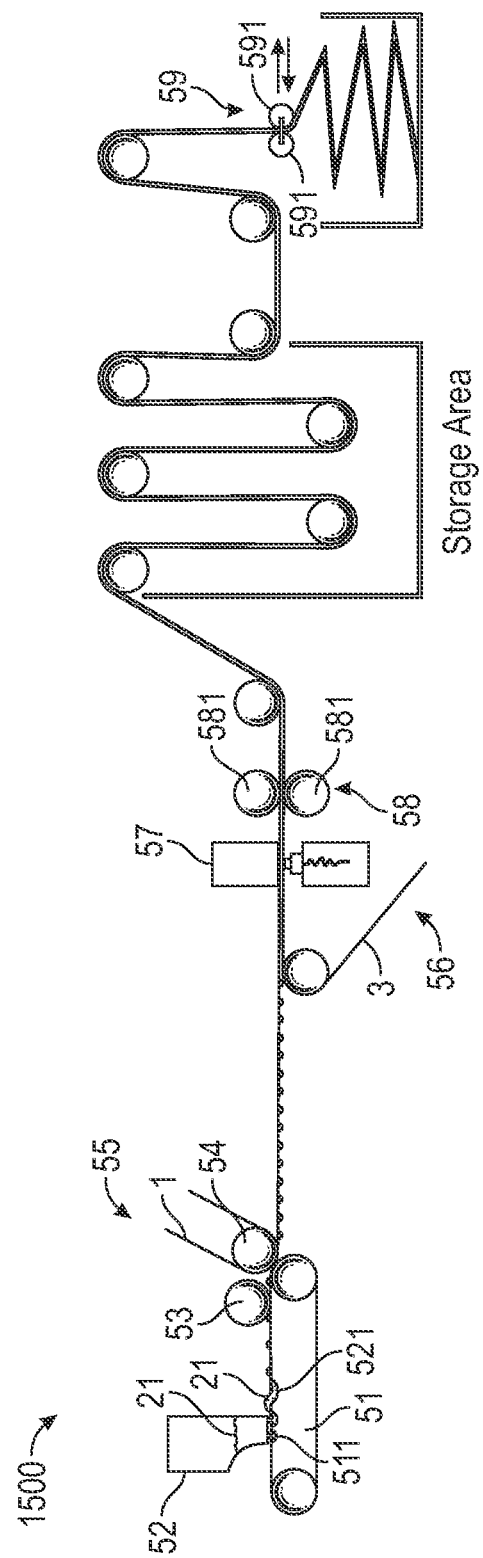
FIG. 9 is a schematic view of one example of an assembly arrangement for a draining construction wrap.

An example production line 1500 for one or more of the draining construction wraps is shown in FIG. 9. The production line includes a sequential material-feeding-and-positioning conveying belt 51, a vibrating material-input funnel 52, a hot melting roller 53, a hot attaching roller 54, a waterproof-and-moisture-permeable-fabric unrolling device 55, a protection-layer unrolling device 56, a heat sealing part 57, a drawing device 58 and a fabric-swinging-and-collecting device 59.

The two ends of the material-feeding-and-positioning conveying belt 51 are driven by rollers to rotate. The rollers drive the rotation by means of motors, provided on the material-feeding-and-positioning conveying belt are grooves 511 that contain part of the elastic protrusions 21 (the support struts). The vibrating material-input funnel 52 is located above the material-feeding-and-positioning conveying belt 51, and comprises an opening 521 that faces toward the material-feeding-and-positioning conveying belt 51. Clearance between the opening 521 and the material-feeding-and-positioning conveying belt 51 has a size that satisfies the requirement for the elastic protrusions 21 to enter the grooves 511 and prevent the elastic protrusions 21 from moving outside of the area projected by the opening 521 onto the material-feeding-and-positioning conveying belt 51. For example, the grooves 511 have a size of the radius of the elastic protrusion 21 beads, while the clearance between the opening 521 and the material-feeding-and-positioning conveying belt 51 is slightly larger than the radius of the elastic protrusion 21 beads but is smaller than the diameter of the elastic protrusion 21 beads.

The waterproof-and-moisture-permeable-fabric unrolling device 55 is used to unroll the waterproof and moisture permeable fabric 1 (e.g., one of the pliable moisture impermeable layer or the pliable moisture permeable layers described herein including composites having fabric, such as non-woven therein), which rolls the waterproof and moisture permeable fabric 1 by means of a rotary roller, where the structure of the waterproof-and-moisture-permeable-fabric unrolling device 55 is the same as or similar to the first unrolling rack 62. (see FIG. 10).

The hot melting roller 53 and the hot attaching roller 54 are provided on the end of the material-feeding-and-positioning conveying belt 51. The hot melting roller 53 first contacts the elastic protrusions 21 (support struts) in the grooves 511 to partially melt (at or above the glass transition temperature or melting temperature) the elastic protrusions 21 on the side away from the grooves 511, the hot attaching roller 54 presses the waterproof and moisture permeable fabric 1 (e.g., one of the impermeable or permeable layers) that is unrolled from the waterproof-and-moisture-permeable-fabric unrolling device 55 on the surface of the melt elastic protrusions 21.

The protection-layer unrolling device 56 comprises a rotary roller to roll or unroll the protection layer 3 (the other of the pliable permeable or pliable impermeable layers). Also provided at a place close to the elastic protrusions 21 is a rotary roller, by passing through which, the protection layer 3 gets closer to or is tightly attached onto the surface of the elastic protrusions 21. The heat sealing part 57 fixes the protection layer 3 with the elastic protrusions 21 by heating, and the heat sealing part 57 may use an ultrasonic heating device to heat through ultrasonically to melt the elastic protrusions 21 close to the protection layer 3 and fix them with the protection layer 3.

As further shown in FIG. 9, the drawing device 58 comprises drawing rollers 581 that are provided at multiple places on the production line, the drawing rollers 581 draw back and guide the waterproof and moisture permeable fabric (e.g., one or more of the pliable impermeable or permeable layers) in the front section through a pressing and rotating action.

The fabric-swinging-and-collecting device 59 comprises a horizontal pushing device and at least one pair of rotary rollers 591, where the horizontal pushing device may use an air cylinder, an oil cylinder or the like. The action end thereof is connected with the racks of the rotary rollers 591, the paired rotary rollers 591 transfer the waterproof and moisture permeable fabric 1 (draining construction wrap) downward through the pressing and rotating action, and the horizontal pushing device drives the paired rotary rollers 591 to move in the horizontal direction so as to swing and stack the fabric for material collection.

Working mechanism: rolling the water proofing and moisture permeable fabric 1 (one of the pliable moisture impermeable or pliable moisture permeable layers) on the waterproof-and-moisture-permeable-fabric unrolling device 55, and the protection layer 3 (the other of the pliable moisture permeable or pliable moisture impermeable layers) being rolled on the protection-layer unrolling device 56, the waterproof-and-moisture-permeable-fabric unrolling device 55 and the protection-layer unrolling device 56 can both use the unrolling rack, the fabric-swinging-and-collecting device 59 can be provided at the end of the entire production line or a manual collecting and rolling can also be used.

The present subject matter provides a fabric-swinging-and-collecting device 59. With the movement of the material-feeding-and-positioning conveying belt 51, the vibrating material-input funnel 52 inputs the elastic protrusions 21 (e.g., the support struts) therein into the grooves 511 on the surface of the material-feeding-and-positioning conveying belt 51. When the elastic protrusions 21 pass through the hot melting roller 53, the hot melting roller 53 heats and melts the elastic protrusions 21 (to or above the glass transition temperature, melting temperature or the like) until the surface is adhesive. As the material-feeding-and-positioning conveying belt 51 moves, the adhesive elastic protrusions 21 are attached onto the waterproof and moisture permeable fabric 1 (one of the impermeable or permeable layers described herein, including composite layers). As the hot attaching roller 54 and the material-feeding-and-positioning conveying belt 51 move together, the elastic protrusions 21 that are placed on the material-feeding-and-positioning conveying belt 51 are attached onto the waterproof and moisture permeable fabric 1 so as to complete the preparation of the three-dimensional waterproof and moisture permeable fabric 1 described in the embodiments shown in FIGS. 3A, B and 4A, B.

Passing the obtained waterproof and moisture permeable fabric 1 through an ultrasonic heat sealing device, where the ultrasonic heat sealing device heats the elastic protrusions 21 that pass through to make them adhesive, which are then fixed with the protection layer 3 (one of the pliable permeable or impermeable layers, including composite layers). A layered wrap is provided including the protection layer 3—elastic protrusions 21—waterproof and moisture permeable fabric 1. During the process, the waterproof and moisture permeable fabric 1 (the draining construction wrap) is transferred through the drawing devices 58 that are pressed tightly against each other, and then materials are collected through the fabric-swinging-and-collecting device so as to fulfill the preparation of the three-dimensional waterproof and moisture permeable fabric 1 described in the embodiments shown in FIGS. 5A, B and 6A, B.

Figure 10:
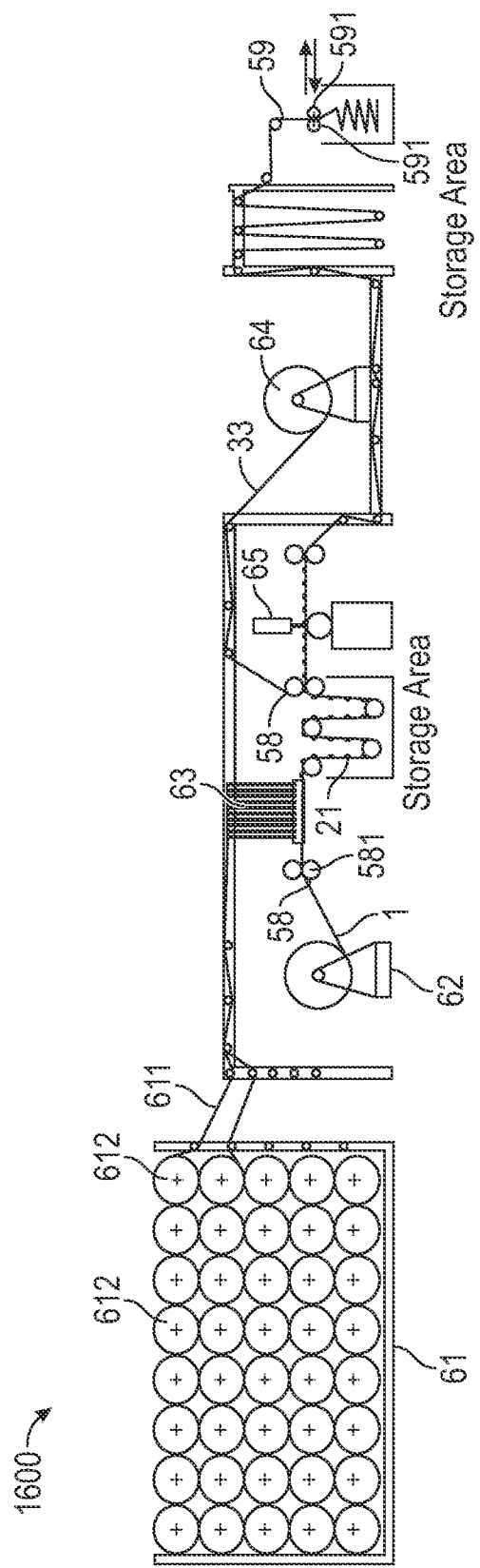
FIG. 10 is a schematic view of another example of an assembly arrangement for a draining construction wrap.

As shown in FIG. 10, a production line 1600 that comprises a foamed-pipe unrolling rack 61, a first unrolling rack 62, a hot cutting device 63, a drawing device 58 and a fabric-swinging-and-collecting device 59, where the fabric-swinging-and-collecting device 59 in FIG. 10 is the same as the one in FIG. 9. The foamed-pipe unrolling rack 61 is rotationally connected with several rotary discs 612 which have the foamed pipes 611 rolled thereon, the number of the rotary discs 612 determines how many elastic protrusions 21 (support struts are fixed in one time. The first unrolling rack 62 unrolls the waterproof and moisture permeable fabric 1 (e.g., one of the pliable moisture impermeable or moisture permeable layers described herein, including composite layers having component permeable fabric layers, such as non-woven, and moisture impermeable component layers) which is rolled on the rotary roller of the first unrolling rack 62.

Figure 12:
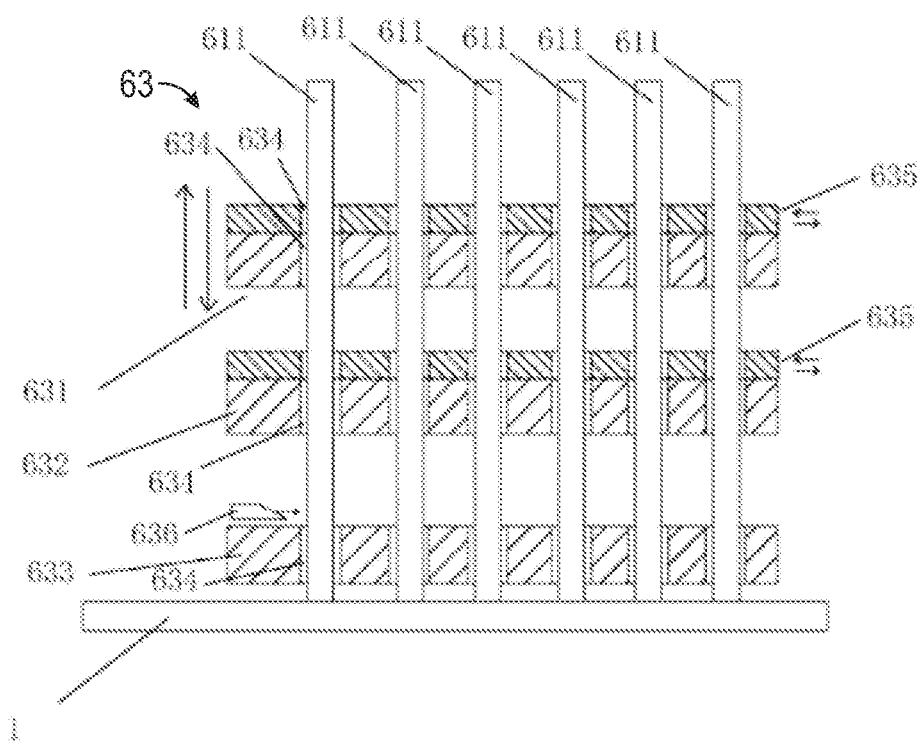
FIG. 12 is a sectional view of one example of a cutting assembly.

As shown in FIG. 12, a hot cutting device 63 includes from the top to the bottom, a lifting clamping plate 631, a fixed clamping plate 632, and a hot-cutting mounting plate 633. Provided on the lifting clamping plate 631, the fixed clamping plate 632 and the hot-cutting mounting plate 633 are through-holes 634 for the foamed pipes (e.g., support struts prior to cutting) to pass through. Provided separately on the lifting clamping plate 631 and the fixed clamping plate 632 are clamping devices 635 for clamping the foamed pipes. In the example shown in FIG. 12, the clamping devices 635 are plates that move on the lifting clamping plate 631 and the fixed clamping plate 632, which also have through-holes thereon. In an example, the plates move by means of an air cylinder. In the process of moving, the through-holes 634 on the plates are arranged in a staggered configuration with the through-holes 634 on the fixed clamping plate 632 or on the lifting clamping plate 631, so as to realize the clamping to the foamed pipes;

As shown in FIG. 12, the hot-cutting mounting plate 633 is connected in a sliding way with an electrically beated knife 636 that cuts and melts the foamed pipes 611 (support struts) which pass through the through-holes 634. The electric heating knife 636 is configured to cut the foamed pipes, and during the cutting process, allow the cut foamed pipes to be melted for the following fixing. The hot cutting device 63 is connected to the action end of the air cylinder to drive, so as to realize the sliding of the electrically beated knife 636 on the hot-cutting mounting plate 633;

As shown in FIG. 10, the drawing device 58 comprises a self-rotary drawing roller 581, the drawing roller 581 draws back the waterproof and moisture permeable fabric 1 (one or more of the pliable impermeable or pliable permeable layers) in the front section by means of the pressing and rotating action, and an individual drawing roller 581 can also change the direction of the fabric.

As shown in FIG. 10, the fabric-swinging-and-collecting device 59 comprises a horizontal pushing device and at least one pair of rotary rollers 591. The horizontal pushing device uses an air cylinder, oil cylinder or the like. The action end thereof is connected with the racks of the rotary rollers 591. The paired rotary rollers 591 transfer the waterproof and moisture permeable fabric 1 downward through the pressing and rotating action. The horizontal pushing device drives the paired rotary rollers 591 to move in the horizontal direction so as to swing and stack the fabric for material collection.

The working mechanism of FIG. 10 is the drawing device 58 draws forward the waterproof and moisture permeable fabric 1 on the first unrolling rack 62. The hot cutting device 63 guides the EVA foamed pipes on the rotary disc to a place above the waterproof and moisture permeable fabric 1. Referring to FIG. 12, the foamed pipes pass sequentially through the through-holes 634 on the hot cutting device 63, and the clamping device 635 on the fixed clamping plate 632 fixes the foamed pipes. The electrically beated knife 636 moves to perform end-face finishing on the foamed pipes that pass through the through-holes 634 on the hot-cutting mounting plate 633, and makes the cuts melted (e.g., engages with the ends of the pipes and heats them for bonding). The clamping device 635 on the lifting clamping plate 631 clamps the foamed pipes, and the clamping device 635 on the fixed clamping plate 632 releases, and the lifting clamping plate 631 moves up and down driven by the air cylinder to let the cuts of the foamed pipes melted after the hot cutting be fixed with the waterproof and moisture permeable fabric 1. The electrically beated knife 636 acts to cut off the foamed pipes to form elastic protrusions 21 (e.g., the support struts, bonded to either of the pliable moisture impermeable or permeable layers). The clamping device 635 on the fixed clamping plate 632 clamps, and the clamping device 635 on the lifting clamping plate 631, driven by the air cylinder, releases and then moves upward to the initial position. The clamping device 635 on the lifting clamping plate 631 is fixed again, and gradually transfers the next section of foamed pipes downward. The process is repeated on the waterproof and moisture permeable fabric 1. The waterproof and moisture permeable fabric 1 with elastic protrusions 21 fixed thereon (the draining construction wrap examples described herein), under the action of the drawing device 58, is collected by the fabric-swinging and collecting device 59.

The foamed pipe is made from foamed materials which is porous inside and is relatively stiff (e.g., to provide the bracing support described herein for maintenance of the drain channels and installation and support of the outer wall). The exterior wall of the periphery (e.g., the installation surface) of the draining construction wrap is relatively stiff, and capable of providing enhanced support to the outer wall.

As shown in FIG. 10, in order to provide the protection layer 3 (e.g., one of the pliable moisture impermeable or moisture permeable layers) made from nonwoven fabric on the three-dimensional waterproof and moisture permeable fabric 1 processed in FIG. 9 on the production line of FIG. 10 a second unrolling rack 64 and an ultrasonic hot stamping device 65 are provided. The second unrolling rack 64 is provided after the hot cutting device 63 to unroll the protection layer 3 to be in contact with the elastic protrusions 21 (support struts). The ultrasonic hot stamping device 65 is provided in between the second unrolling rack 64 and the fabric-swinging-and-collecting device 59, to heat the elastic protrusions 21 and to fix the elastic protrusions 21 with the protection layer 3.

The second unrolling rack 64 is located in between the hot cutting device 63 and the fabric-swinging-and-collecting device 59. On the second unrolling rack 64 rolled with the protection layer 3, where the structure of the second unrolling rack 64 is the same as that of the first unrolling rack 62, when the waterproof and moisture permeable fabric 1 is moving, the protection layer 3 of the second unrolling rack 64 moves to contact with the elastic protrusions 21 on the first waterproof and moisture permeable fabric 1. The protection layer 3 is fixed with the elastic protrusions 21 through the ultrasonic hot stamping device 65 to form a three-dimensional waterproof and moisture permeable fabric 1 (e.g., a draining construction wrap including each of the pliable moisture impermeable and moisture permeable layers(.

Lastly, the waterproof and moisture permeable fabric 1 is collected by the fabric-swinging-and-collecting device 59. In the production lines 1500, 1600, the fabric storage area is formed by multiple rollers that are arranged both vertically and horizontally to tension the fabric and satisfy the requirement of hot cutting by frames, for instance as shown in FIG. 12.

In an example production, the draining construction wraps shown at least in FIGS. 3A-6B includes a certain degree of structural strength (e.g., with the support struts providing braced installation surfaces) and complies with architecture standards on fireproofing and anti-combustion performance. In addition, during a waterproofing test and a moisture permeablity test, the draining construction wrap examples provide good waterproofing performance and good moisture permeating performance.

In the examples provided herein, the material for the first nonwoven fabric and the second nonwoven fabric (e.g., permeable layers and nonwoven component layers) may use materials made from nonwoven fabric or other materials that satisfy the requirements for architectural standards, building codes or the like. For example, with a grammage of 30-90 $g/m^2$, the waterproof and moisture permeable functional layer is constructed with materials such as polyethylene (PE) film or thermoplastic polyurethane (TPU) with a grammage of 20-30 $g/m^2$, and the material for the elastic protrusions includes foamed beads or small cylinders of polypropylene (PP), polyethylene (PE) or ethylene-vinyl acetate (EVA) (diameter of 6-10 mm, hardness of 70HRC), and the protection layer (pliable moisture impermeable layer) uses anti-water nonwoven fabric or other woven fabric with a grammage of 30-90 $g/m^2$. The pliable moisture impermeable layer (e.g., including component permeable and impermeable layers) is configured to provide moisture impermeability to prevent moisture ingress while having porosity configured to facilitate gas permeability, for instance to facilitate breathing of a building from the interior to the exterior.

Optionally, the draining construction wrap examples described herein include a composite pliable moisture impermeable layer including Step one: combining the first nonwoven fabric layer 912 with the waterproof and moisture permeable functional layer 910, which is then combined with the second nonwoven fabric layer 914 to obtain a work in process (see FIG. 3B): the waterproof and moisture permeable fabric 1 (fed into the production line of FIG. 9). Step two (optional): printing a logo on the first nonwoven fabric layer 11 using a printer. Step three: hot stamping the elastic protrusions 21 (support struts 906 in FIG. 3B, and 1106 in FIG. 5B) evenly and regularly on the first nonwoven fabric layer 11, where the elastic protrusions 21 attach regularly to the first nonwoven fabric layer 11 after melting with the hot stamping machine to ensure the elastic protrusions 21 having a height of 1-20 mm or more. Step four: packaging.

In another example, the draining construction wrap examples described herein include a composite pliable moisture impermeable layer (FIGS. 5A, B, 1102) and a pliable moisture permeable layer (1111). Step one: combining the first nonwoven fabric layer 912 with the waterproof and moisture permeable functional layer 910, which is then combined with the second nonwoven fabric layer 914 to obtain a work in process: the waterproof and moisture permeable fabric 1 (fed into the production line 1600 of FIG. 10). Step two: hot stamping the elastic protrusions 21 (e.g., support struts 1106) evenly and regularly on the first nonwoven fabric layer 11, where the elastic protrusions 21 attach regularly to the first nonwoven fabric layer 11 after melting with the hot stamping machine to ensure the elastic protrusions 21 having a height of 1-20 mm or greater. Step three: covering the protection layer 3 (e.g., pliable moisture permeable layer 1111) on the elastic protrusions 21. Step four (optional): printing a logo on the protection layer 3 using a printer. Step five: packaging.

Figure 11:
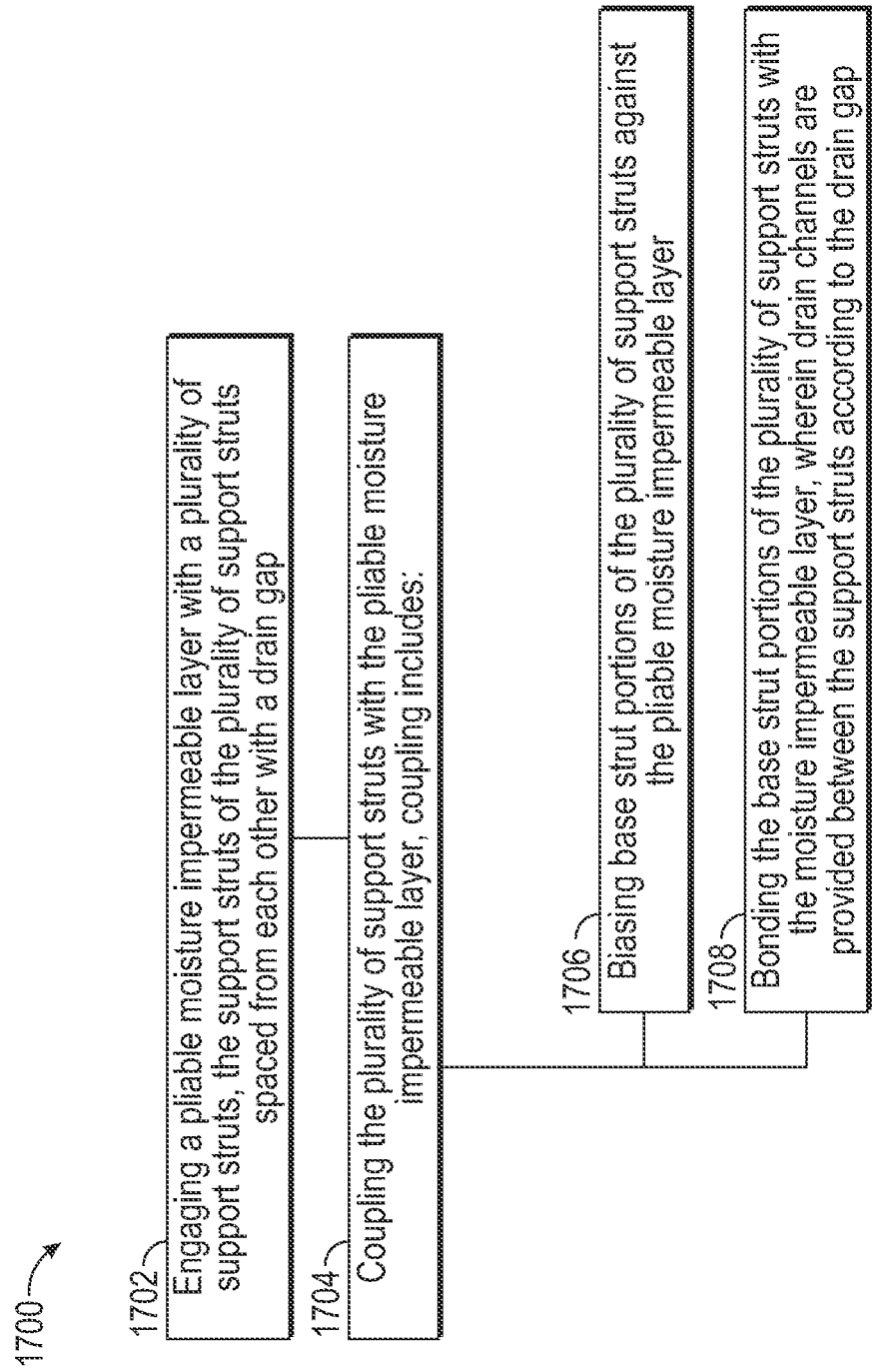
FIG. 11 is a block diagram showing one example of a method for making a draining construction wrap.

FIG. 11 shows one example of a method 1100 for making draining construction wrap including one or more of the draining construction wrap examples described herein. In describing the method 1100, reference is made to one or more components, features, functions or steps previously described herein. Where convenient, reference is made to the components, features, steps or the like with reference numerals. The reference numerals provided are exemplary and are not exclusive. For instance, components, features, functions, steps or the like described in the method 1100 include, but are not limited to, the corresponding numbered elements provided herein and other corresponding elements described herein (both numbered and unnumbered) as well as their equivalents.

At 1702, the method 1700 includes engaging a pliable moisture impermeable layer with a plurality of support struts. As described herein, the support struts provide a braced installation surface that maintains drain channels therebetween. The support struts are spaced from each other by a drain gap (for instance, related to the density and profile of the support struts on the layer). Additionally, the plurality of support struts provide a stable platform for installation of outer wall components.

At 1704, the support struts are coupled with the pliable moisture impermeable layer including composite layered assemblies, nonwoven layers or the like. Coupling the support struts with the layer includes biasing the support struts and bonding the support struts to the layer. For example, at 1706 coupling includes biasing base strut portions of the plurality of support struts against the layer. Biasing includes one or more of pressing the layer toward the support struts or pressing the support struts toward the layer. Pressing of the components together includes, but is not limited to, engaging rollers at a nip that compresses the layer and the struts together, pressing a platen against the layer or struts, pressing a cutting and heating assembly (e.g., a hot knife assembly) as described herein toward the layer, pressing a dispensing system, such as an extruder toward the layer or the like.

At 1708, coupling the plurality of support struts to the layer includes bonding the base strut portions of the plurality of struts with the layer (e.g., the pliable moisture impermeable layer, moisture permeable layer or the like). In one example, bonding includes heating of a portion of the support struts, such as base strut portions, with a heated platen, heated knife or the like to temperatures at or above the glass transition or melting temperatures of the strut material. The biasing of the plurality of struts toward the layer causes infiltration, welding or the like of the strut material to the layer. The draining construction wrap is cooled (passively with ambient air or actively) to set the support struts. In another examples, bonding includes extruding the strut material at the layer to initiate a weld, infiltration or the like with the layer. In still other examples, the plurality of struts are cut from with a hot knife assembly. The struts are formed from polymer cylinders. The heated knife is pressed (with a planar face) against the end of the polymer cylinders to heat the strut material. The cylinders are biased into the layer and the cylinder ends (base strut portions) bond with the layer. The edge of the heated knife cuts across the cylinders (e.g., forming the strut support faces) and frees the support struts from the cylinders. In another example, heating cutting of the cylinders melts the remaining cylinder in preparation for bonding to another segment of the layer (e.g., advanced by conveyor).

In still other examples, an adhesive is applied to the base strut portion or the layer. Biasing initiates the bonding through adhesion between the struts and the layer. Optionally, other methods for bonding include, but are not limited to, laser welding, ultrasonic welding or the like.

Several options for the method follow. In one example, another layer is applied to the draining construction wrap, for instance to the strut support faces. A layer, such as a pliable moisture permeable layer (for use with stucco or the like), is layered over the plurality of support struts and the underlying layer (e.g., a pliable moisture impermeable layer). In a manner similar to the coupling described at 1704, the added layer is bonded to the strut support faces (e.g., with heat, adhesives, welds, extrusion or the like). In this example, the installation support surface of the example draining construction wrap includes the strut support faces and the added layer spanning the strut support faces.

In another example, the method 1700 includes spacing the support struts from each other according to a drain gap. For example, if a drain channel size (width) or ratio of drain area to strut support area is specified the method 1700 includes arranging the plurality of support struts in a configuration to achieve the specified size or ratio.

The present subject matter is further described in detail in the preceding and following specification in combination with the Figures. The present embodiments are only explanations to the present subject matter rather than limitations. A person skilled in the art, after reading the description, may make modifications to the present subject matter as needed.

Embodiment 1

Figure 13:
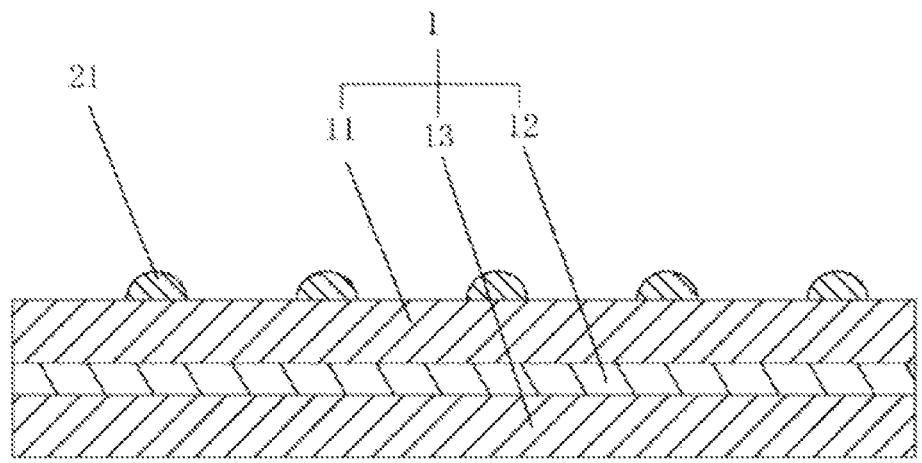
FIG. 13 is another sectional view of the draining construction wrap of FIG. 3A.
Figure 14:
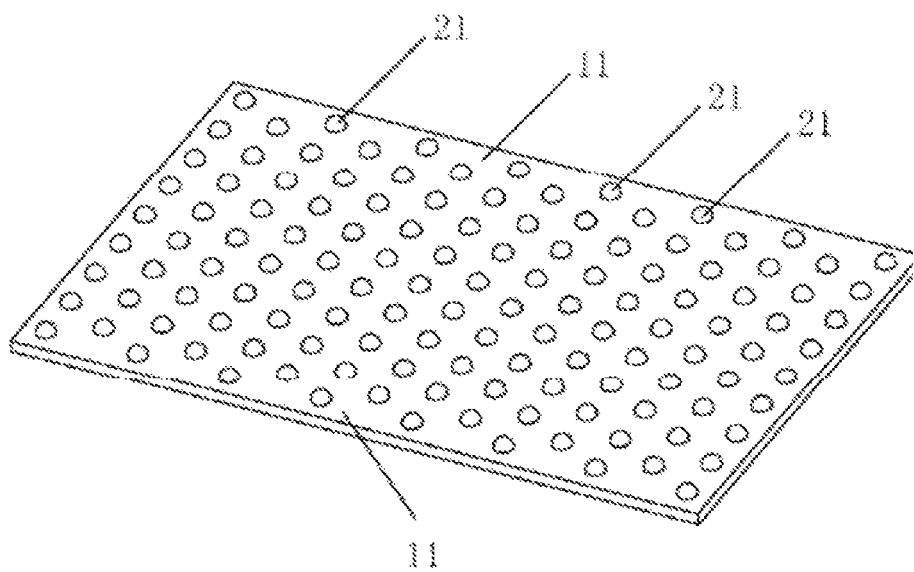
FIG. 14 is a perspective view of the draining construction wrap of FIG. 3A.
Figure 15:
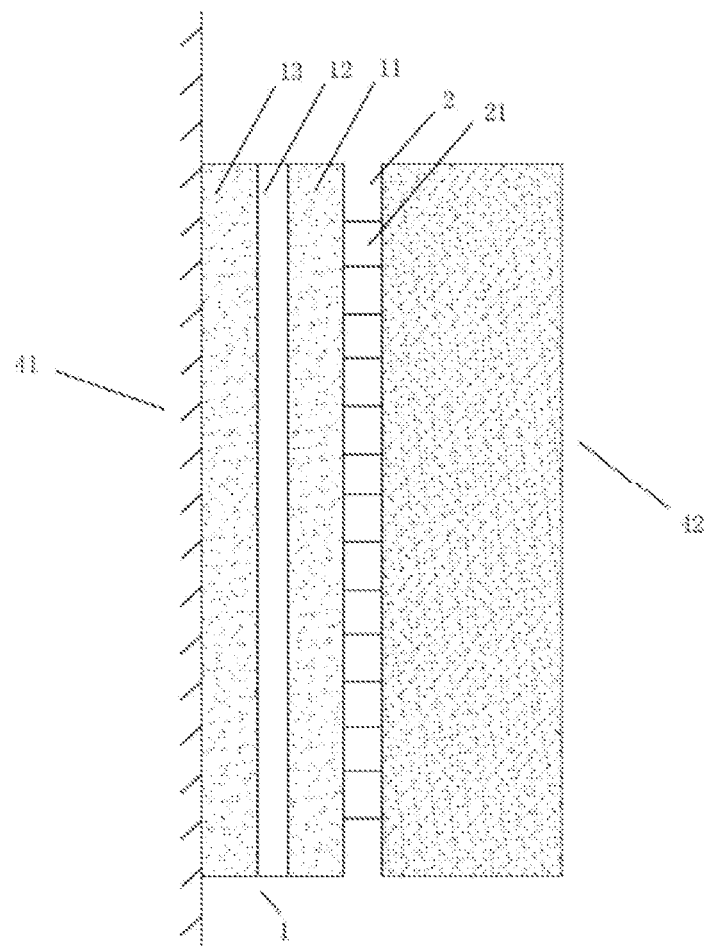
FIG. 15 is another sectional view of the draining construction wrap of FIG. 3B.

A three-dimensional waterproof and moisture permeable fabric, as shown in FIG. 13, comprises sequentially from the top to the bottom a waterproof and moisture permeable fabric 1 and a clearance layer 2 (forming an air duct inside the wall structure), wherein the waterproof and moisture permeable fabric 1 comprises three layers: the first nonwoven fabric layer 11, the waterproof and gas permeable (to facilitate breathing and vapor transmission from the interior to the exterior) functional layer 12, and the second nonwoven fabric layer 13; the thicknesses ratio of the first nonwoven fabric layer 11 vs. the waterproof and moisture permeable functional layer 12 vs. the second nonwoven fabric layer 13 is 5:2:3. The waterproof and moisture permeable functional layer 12 can be made from material such as PE or TPU, as shown in FIG. 15. The clearance layer 2 (see FIG. 15) is formed by several elastic protrusions 21 (e.g., support struts) which have a structure as shown in FIG. 14 and are made from plastic substances with certain elasticity; the elastic protrusions 21 are provided on the first nonwoven fabric layer 11.

In the subject matter described herein, the three-dimensional waterproof and moisture permeable fabric (a draining construction wrap) refers, in one example, to the structure of a waterproof and moisture permeable fabric 1 plus the elastic protrusions 21 added thereon. In another example, the waterproof and moisture permeable fabric 1 refers to a three-layered composite structure with the first nonwoven fabric layer 11, the waterproof and moisture permeable functional layer 12 and the second nonwoven fabric layer 13.

Embodiment 2

A production method for the three-dimensional waterproof and moisture permeable fabric includes the following steps: Step 1: fix the waterproof and moisture permeable fabric 1 and level the surface. Step 2: heat the elastic protrusions 21 until adhesive (e.g., at or above a glass transition or melting temperature). The present subject matter, in one example, uses heating methods including hot stamping, thermal radiation heating or sonic heating (e.g., ultrasound). Step 3: attach the elastic protrusions 21 obtained from step 2 onto the surface of the first waterproof layer 1 to form the whole three-dimensional waterproof and moisture permeable fabric (see FIG. 13).

Embodiment 3

A production method for the three-dimensional waterproof and moisture permeable fabric (another example draining construction wrap) includes the following steps: Step 1: fix the waterproof and moisture permeable fabric 1 and level the surface. Step 2: fix the elastic protrusions 21 on the surface of the first nonwoven fabric layer 11 by means of laser welding to form a whole three-dimensional waterproof and moisture permeable fabric. The three-dimensional waterproof and moisture permeable fabric prepared here is the three-dimensional waterproof and moisture permeable fabric shown in FIG. 13.

Embodiment 4

A production method for the three-dimensional waterproof and moisture permeable fabric includes the following steps: Step 1: fix the waterproof and moisture permeable fabric 1 and level the surface; Step 2: let the prepared melt elastic protrusions 21 be arranged on the first nonwoven fabric 11 with a distribution amount of 50-600 per square meter. The specific amount distributed is determined depending on the performance requirement of the three-dimensional waterproof and moisture permeable fabric. The placement method is to heat and melt PP or PE or PU or EVA or foamed PP or foamed PE or foamed PU or foamed EVA, by means of an injection molding machine before filling into a roller body that has through-holes opened at the periphery, when the roller body rotates, drops of the above material fall on the first nonwoven fabric 11 and form elastic protrusions 21 on the first nonwoven fabric 11 after cooling. Step 3: The fabric 1 stands until the elastic protrusions 21 cool down and are cured and attached on the waterproof and moisture permeable fabric 1. The three-dimensional waterproof and moisture permeable fabric prepared here is the composite material of the waterproof and moisture permeable fabric shown in Embodiment FIG. 13.

Embodiment 5

An exterior wall structure, as shown in FIG. 15, comprising an interior wall panel 41 and an exterior wall panel 42 (e.g., an outer wall), wherein the interior wall panel 41 and the exterior wall panel 42 are both made of wood panels. Attach the three-dimensional waterproof and moisture permeable fabric from FIG. 13 on the surfaces of the interior wall panel 41 or of the exterior wall panel 42 with the elastic protrusions 21 facing toward the exterior wall panel 42. Fix the three-dimensional waterproof and moisture permeable fabric on the interior wall panel 41 by means of airgun nails, and then fix the exterior wall panel 42 on the three-dimensional waterproof and moisture permeable fabric to form a clearance layer 2 (e.g., an air duct including drain channels therein) in between the interior wall panel 41 and the exterior wall panel 42.

Embodiment 6

Figure 16:
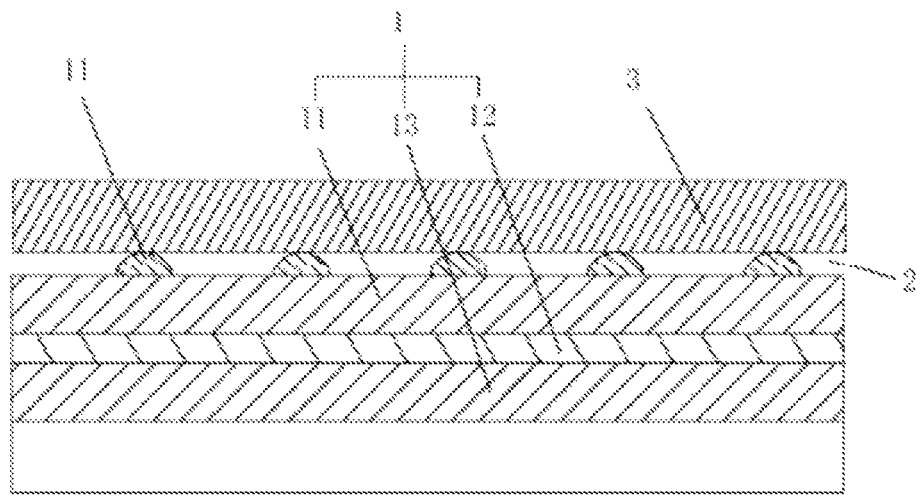
FIG. 16 is another sectional view of the draining construction wrap including a pliable moisture permeable layer.
Figure 17:
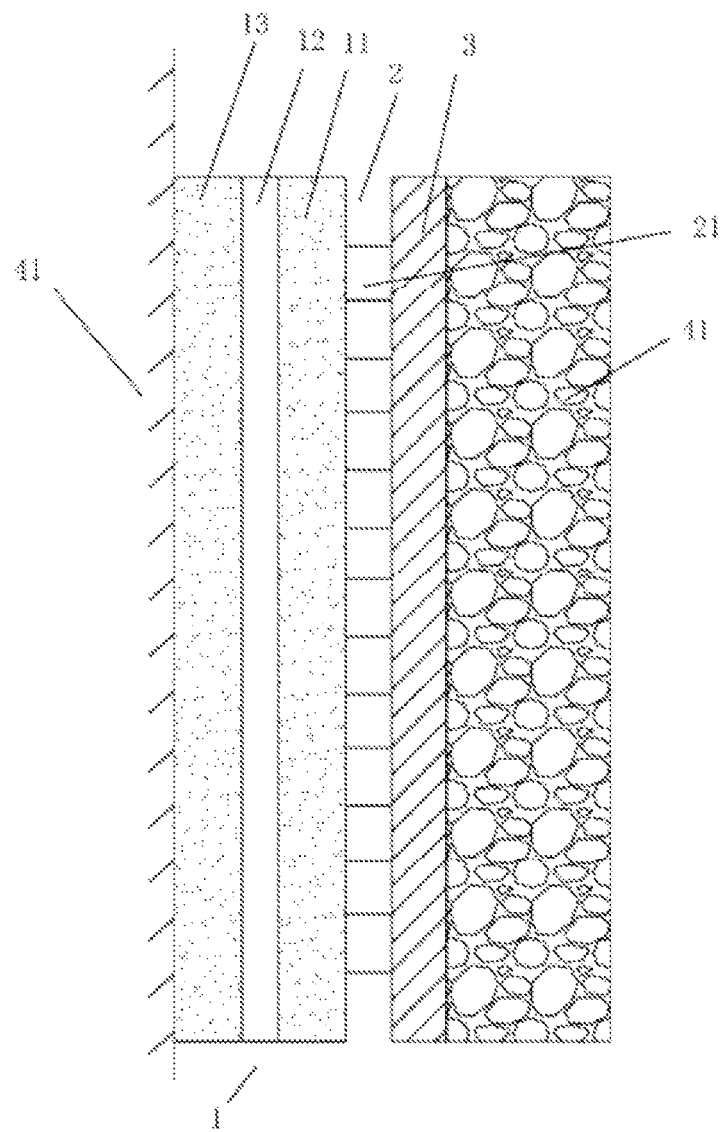
FIG. 17 is another sectional view of the draining construction wrap of FIG. 5A.
Figure 18:
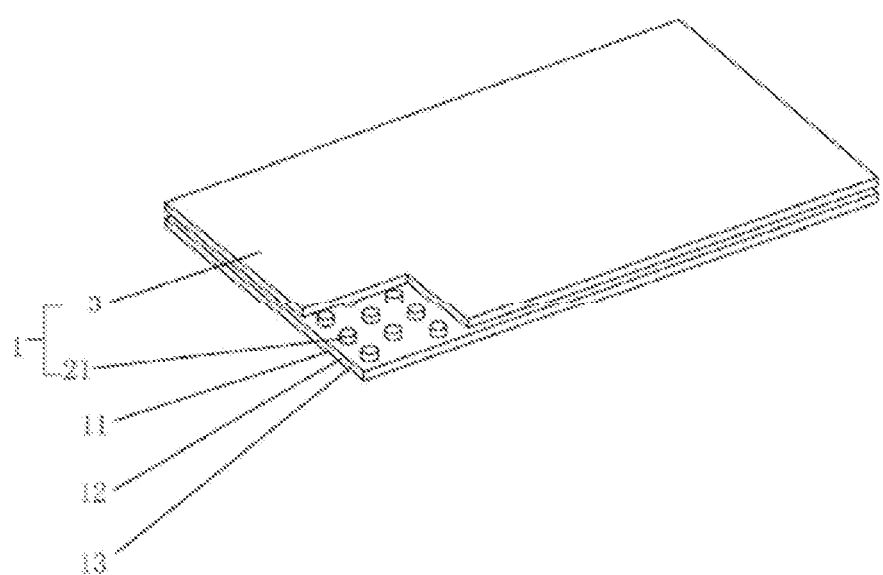
FIG. 18 is another perspective view of the draining construction wrap of FIG. 5A.

A three-dimensional waterproof and moisture permeable fabric, as shown in FIGS. 16 and 17, which comprises sequentially, from the bottom to top, a waterproof and moisture permeable fabric 1, a clearance layer 2 and a protection layer 3. In the example shown in FIG. 16 the waterproof and moisture permeable fabric 1 includes three layers: a first nonwoven fabric layer 11, a waterproof and moisture permeable functional layer 12 and a second nonwoven fabric layer 13. In one example, the thickness ratio of the first nonwoven fabric layer 11 versus the waterproof and moisture permeable functional layer 12 versus the second nonwoven fabric layer 13 is 5:2:3. The waterproof and moisture permeable functional layer 12 can be made from materials such as PE or TPU. The clearance layer 2 includes a plurality of elastic protrusions 21 (e.g., support struts) made from polymers with certain elasticity. The elastic protrusions include thicknesses of 2 millimeters-10 millimeters or more. One end of the elastic protrusions 21 is fixed on the first nonwoven fabric layer 13 including a nonwoven fabric. The clearance layer 2 is between the waterproof and moisture permeable fabric 1 and the protection layer 3, and spaces the layers 1, 3 by the thicknesses of the elastic protrusions 21.

Embodiment 7

A production method for the three-dimensional waterproof and moisture permeable fabric as shown in FIG. 17 includes: Step 1: fix the waterproof and moisture permeable fabric 1 and level the surface. Step 2: melt the elastic protrusions 21 (e.g., the support struts) by means of hot stamping until the surface is adhesive. Step 3: fix the adhesive side of the elastic protrusions 21 obtained in step 2 on the surface of the waterproof and moisture permeable fabric 1. Step 4: continue to heat the elastic protrusions 21 at the side away (or remote) from the waterproof and moisture permeable fabric 1 until it is adhesive (at or above one or more of the glass transition or melting temperatures). Step 5: place and fix the protection layer 3 on the surface of the elastic protrusions 21 to complete the production of the three-dimensional waterproof and moisture permeable fabric (see FIG. 17).

In one example, the fabric 1 (e.g., a draining construction wrap) is coupled along an interior wall panel 41 as in FIG. 17. The three-dimensional waterproof and moisture permeable fabric described herein (see FIG. 17) is coupled along the interior wall panel 41, and a metal screen is fixed on the surface of the protection layer 3. Stucco is plastered on the metal screen to form a composite wall assembly including the metal screen and concrete.

Various Notes and Aspects

Aspect 1 includes subject matter such as can include a draining construction wrap comprising: a pliable moisture impermeable layer having an interior surface and an exterior surface; a drainage framework configured to channel moisture across the exterior surface of the pliable moisture impermeable layer, the drainage framework includes: a plurality of support struts, each of the support struts of the plurality of support struts includes: a base strut portion coupled with the exterior surface of the pliable moisture impermeable layer; a strut support face; and a strut body extending from the base strut portion to the strut support face; and a plurality of drain channels between the support struts; and an installation surface configured for coupling with an outer wall, the installation surface includes the strut support faces of the plurality of support struts, wherein the strut bodies of the plurality of support struts brace the installation surface and the pliable moisture impermeable layer is recessed from the installation surface with a strut gap therebetween.

Aspect 2 can include, or can optionally be combined with the subject matter of Aspect 1, to optionally include wherein strut body is rigid relative to the pliable moisture impermeable layer.

Aspect 3 can include, or can optionally be combined with the subject matter of one or any combination of Aspects 1 or 2 to optionally include wherein the plurality of support struts brace the installation surface in a planar configuration.

Aspect 4 can include, or can optionally be combined with the subject matter of one or any combination of Aspects 1-3 to optionally include wherein the strut body includes a strut profile.

Aspect 5 can include, or can optionally be combined with the subject matter of one or any combination of Aspects 1-4 to optionally include wherein the strut profile includes one or more of square, rectangular, triangular, ovular or circular profiles.

Aspect 6 can include, or can optionally be combined with the subject matter of Aspects 1-5 to optionally include wherein a composite strut coverage area of the strut profiles of the plurality of support struts is less than channel coverage area of the plurality of drain channels.

Aspect 7 can include, or can optionally be combined with the subject matter of Aspects 1-6 to optionally include wherein the strut support face includes a planar strut support face, and the planar strut support faces of the plurality of support struts are flush.

Aspect 8 can include, or can optionally be combined with the subject matter of Aspects 1-7 to optionally include wherein the plurality of support struts include one or more of a polymer or a foamed polymer.

Aspect 9 can include, or can optionally be combined with the subject matter of Aspects 1-8 to optionally include a pliable moisture permeable layer coupled along the strut support faces of the plurality of support struts, and the pliable moisture permeable layer is configured to permit moisture ingress to the plurality of drain channels between the support struts.

Aspect 10 can include, or can optionally be combined with the subject matter of Aspects 1-9 to optionally include wherein the pliable moisture permeable layer includes a non-woven substrate.

Aspect 11 can include, or can optionally be combined with the subject matter of Aspects 1-10 to optionally include the outer wall, wherein the outer wall includes one or more of cladding, siding, masonry, stone, wood panels, composite panels, masonry panels, polymer laminate panels, stainless steel or tile.

Aspect 12 can include, or can optionally be combined with the subject matter of Aspects 1-11 to optionally include wherein the support struts of the plurality of support struts are arranged in one or more of rows or columns, and the support struts and the pliable moisture impermeable layer are the boundaries of the drain channels between the support struts in the rows or columns.

Aspect 13 can include, or can optionally be combined with the subject matter of Aspects 1-12 to optionally include wherein the pliable moisture impermeable layer is bonded with an inner wall panel prior to installation of the inner wall panel.

Aspect 14 can include, or can optionally be combined with the subject matter of Aspects 1-13 to optionally include a draining construction wrap comprising: a pliable moisture impermeable layer; a pliable moisture permeable layer spaced from the pliable moisture impermeable layer; a drainage framework between the pliable moisture impermeable and moisture permeable layers, the drainage network includes: a plurality of support struts, each of the support struts of the plurality of support struts includes: a strut support face coupled with the pliable moisture permeable layer; and a strut body extending from the pliable moisture impermeable layer to the strut support face; drain channels between the support struts and between the pliable moisture impermeable and pliable moisture permeable layers; and wherein the pliable moisture impermeable layer is recessed from the pliable moisture permeable layer with the plurality of support struts and drainage channels therebetween.

Aspect 15 can include, or can optionally be combined with the subject matter of Aspects 1-14 to optionally include wherein the plurality of support struts brace the strut support faces in a flush planar configuration.

Aspect 16 can include, or can optionally be combined with the subject matter of Aspects 1-15 to optionally include wherein the plurality of support struts position and brace the strut support faces and the pliable moisture permeable layer relative to the pliable moisture impermeable layer across a strut gap corresponding to a length of the strut bodies.

Aspect 17 can include, or can optionally be combined with the subject matter of Aspects 1-16 to optionally include wherein strut body is rigid relative to the pliable moisture impermeable layer.

Aspect 18 can include, or can optionally be combined with the subject matter of Aspects 1-17 to optionally include wherein the strut body includes a strut profile.

Aspect 19 can include, or can optionally be combined with the subject matter of Aspects 1-18 to optionally include wherein a composite strut coverage area of the strut profiles of the plurality of support struts is less than the channel coverage area of the plurality of drain channels.

Aspect 20 can include, or can optionally be combined with the subject matter of Aspects 1-19 to optionally include wherein the strut support face includes a planar strut support face, and the planar strut support faces of the plurality of support struts are flush.

Aspect 21 can include, or can optionally be combined with the subject matter of Aspects 1-20 to optionally include wherein the pliable moisture permeable layer is configured to permit moisture ingress to the plurality of drain channels between the support struts.

Aspect 22 can include, or can optionally be combined with the subject matter of Aspects 1-21 to optionally include wherein one or more of the pliable moisture permeable layer or the pliable moisture impermeable layer includes a non-woven substrate.

Aspect 23 can include, or can optionally be combined with the subject matter of Aspects 1-22 to optionally include an installation surface configured for coupling with an outer wall, the installation surface includes the strut support faces of the plurality of support struts and the pliable moisture permeable layer; and wherein the strut bodies of the plurality of support struts brace the installation surface and recess the pliable moisture impermeable layer from the installation surface with a strut gap therebetween.

Aspect 24 can include, or can optionally be combined with the subject matter of Aspects 1-23 to optionally include wherein the support struts of the plurality of support struts are arranged in one or more of rows or columns, and the support struts and the pliable moisture impermeable layer are the boundaries of the drain channels between the support struts in the rows or columns.

Aspect 25 can include, or can optionally be combined with the subject matter of Aspects 1-24 to optionally include wherein the pliable moisture impermeable layer is bonded with an inner wall panel prior to installation of the inner wall panel.

Aspect 26 can include, or can optionally be combined with the subject matter of Aspects 1-25 to optionally include a method for making a draining construction wrap comprising: engaging a pliable moisture impermeable layer with a plurality of support struts, the support struts of the plurality of support struts spaced from each other with a drain gap; and coupling the plurality of support struts with the pliable moisture impermeable layer, coupling includes: biasing base strut portions of the plurality of support struts against the pliable moisture impermeable layer; and bonding the base strut portions of the plurality of support struts with the moisture impermeable layer, wherein drain channels are provided between the support struts according to the drain gap.

Aspect 27 can include, or can optionally be combined with the subject matter of Aspects 1-26 to optionally include wherein engaging the pliable moisture impermeable layer with the plurality of support struts includes setting of the plurality of support struts along the pliable moisture impermeable layer.

Aspect 28 can include, or can optionally be combined with the subject matter of Aspects 1-27 to optionally include wherein coupling the plurality of support struts with the pliable moisture impermeable layer includes heating the base strut portions.

Aspect 29 can include, or can optionally be combined with the subject matter of Aspects 1-28 to optionally include wherein bonding the base strut portions with the moisture impermeable layer includes cooling and setting a material of the base strut portions biased against the pliable moisture impermeable layer.

Aspect 30 can include, or can optionally be combined with the subject matter of Aspects 1-29 to optionally include wherein coupling the plurality of support struts with the pliable moisture impermeable layer includes applying an adhesive to the base strut portion.

Aspect 31 can include, or can optionally be combined with the subject matter of Aspects 1-30 to optionally include coupling the plurality of support struts with a pliable moisture permeable layer, and coupling includes: biasing strut support faces of the plurality of support struts against the pliable moisture permeable layer; and bonding the strut support faces of the plurality of support struts with the moisture permeable layer.

Aspect 32 can include, or can optionally be combined with the subject matter of Aspects 1-31 to optionally include cutting a plurality of elongate struts into the plurality of support struts.

Aspect 33 can include, or can optionally be combined with the subject matter of Aspects 1-32 to optionally include wherein cutting the plurality of elongate struts includes: spacing the elongate struts from each other according to the drain gap; and cutting the plurality of support struts from the spaced elongate struts.

Aspect 34 can include, or can optionally be combined with the subject matter of Aspects 1-33 to optionally include wherein coupling the plurality of support struts with the pliable moisture impermeable layer includes coupling of the cut plurality of support struts with the pliable moisture impermeable layer.

Aspect 35 can include, or can optionally be combined with the subject matter of Aspects 1-34 to optionally include wherein the support struts of the plurality of support struts include strut bodies and strut support faces, and coupling the plurality of support struts with the pliable moisture impermeable layer includes: forming an installation surface with the strut support faces of the plurality of support struts, and the pliable moisture impermeable layer is recessed from the installation surface with a strut gap corresponding to a length of the strut bodies of the plurality of support struts.

Aspect 36 can include, or can optionally be combined with the subject matter of Aspects 1-35 to optionally include wherein forming the installation surface with the strut support faces includes bracing the installation surface in a planar configuration with the plurality of support struts.

Aspect 37 can include, or can optionally be combined with the subject matter of Aspects 1-36 to optionally include comprising bonding the pliable moisture impermeable layer with an inner wall panel prior to installation of the inner wall panel.

Each of these non-limiting aspects can stand on its own, or can be combined in various permutations or combinations with one or more of the other aspects.

The above description includes references to the accompanying drawings, which form a part of the detailed description. The drawings show, by way of illustration, specific embodiments in which the invention can be practiced. These embodiments are also referred to herein as "aspects" or "examples." Such aspects or example can include elements in addition to those shown or described. However, the present inventors also contemplate aspects or examples in which only those elements shown or described are provided. Moreover, the present inventors also contemplate aspects or examples using any combination or permutation of those elements shown or described (or one or more features thereon, either with respect to a particular aspects or examples (or one or more features thereof), or with respect to other Aspects (or one or more features thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," or the like are used merely as labels, and are not intended to impose numerical requirements on their objects.

Geometric terms, such as "parallel", "perpendicular", "round", or "square", are not intended to require absolute mathematical precision, unless the context indicates otherwise instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

The above description is intended to be illustrative, and not restrictive. For example, the above-described aspects or examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as aspects, examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A draining construction wrap comprising:
a pliable moisture impermeable layer having an interior surface and an exterior surface;
a pliable moisture permeable layer;
a pliable drainage framework configured to channel moisture across the exterior surface of the pliable moisture impermeable layer, the drainage framework includes:
  a plurality of separate support struts separate from the pliable moisture impermeable and permeable layers, each of the support struts of the plurality of support struts includes:
    a base strut portion directly engaged with the exterior surface of the pliable moisture impermeable layer;
    a strut support face directly engaged with the pliable moisture permeable layer, and the strut support face is remote from the exterior surface of the pliable moisture impermeable layer relative to the base strut portion; and
    a strut body extending from the base strut portion and the exterior surface to the strut support face;
  a plurality of drain channels between the support struts, and wherein the pliable moisture permeable layer is configured to permit moisture ingress to the plurality of drain channels;
wherein each of the pliable moisture permeable and impermeable layers and the pliable drainage framework are configured to comply around corners; and
wherein the pliable moisture permeable layer is configured to directly engage with an outer wall, the strut bodies of the plurality of support struts brace the pliable moisture permeable layer, and the exterior surface of the pliable moisture impermeable layer is recessed from the pliable moisture permeable layer with a strut gap therebetween.

2. The draining construction wrap of claim 1, wherein strut body is rigid relative to the pliable moisture impermeable layer.

3. The draining construction wrap of claim 1, wherein the plurality of support struts brace the installation surface in a planar configuration.

4. The draining construction wrap of claim 1, wherein the strut body includes a strut profile.

5. The draining construction wrap of claim 4, wherein the strut profile includes one or more of square, rectangular, triangular, ovular or circular profiles.

6. The draining construction wrap of claim 4, wherein a composite strut coverage area of the strut profiles of the plurality of support struts is less than channel coverage area of the plurality of drain channels.

7. The draining construction wrap of claim 1, wherein the strut support face includes a planar strut support face, and the planar strut support faces of the plurality of support struts are flush.

8. The draining construction wrap of claim 1, wherein the plurality of support struts include one or more of a polymer or a foamed polymer.

9. The draining construction wrap of claim 1, wherein the pliable moisture permeable layer includes a non-woven substrate.

10. The draining construction wrap of claim 1 comprising the outer wall, wherein the outer wall includes one or more of cladding, siding, masonry, stone, wood panels, composite panels, masonry panels, polymer laminate panels, stainless steel or tile.

11. The draining construction wrap of claim 1, wherein the support struts of the plurality of support struts are arranged in one or more of rows or columns, and the support struts and the pliable moisture impermeable layer are the boundaries of the drain channels between the support struts in the rows or columns.

12. The draining construction wrap of claim 1, wherein the pliable moisture impermeable layer is bonded with an inner wall panel prior to installation of the inner wall panel.

13. The draining construction wrap of claim 1, wherein the separate support struts are coupled together with portions of the pliable moisture impermeable layer and portions of the pliable moisture permeable layer extending between the separate support struts.

14. The draining construction wrap of claim 13, wherein the portions of pliable moisture impermeable layer and the portions of the pliable moisture permeable layer are directly coupled with the separate support struts.

15. A draining construction wrap comprising:
a pliable moisture impermeable layer having an interior surface and an exterior surface;
a pliable moisture permeable layer spaced from the pliable moisture impermeable layer, the pliable moisture permeable layer configured to engage with an outer wall;
a pliable drainage framework interposed between the pliable moisture impermeable and moisture permeable layers, the pliable drainage network includes:
  a plurality of separate support struts, each of the support struts of the plurality of support struts includes:

a strut support face directly engaged with the pliable moisture permeable layer, the strut support face is remote from the exterior surface of the pliable moisture impermeable layer; and a strut body directly engaged with the exterior surface of the pliable moisture impermeable layer, and the strut body extends to the strut support face;

drain channels between the support struts and between the pliable moisture impermeable and pliable moisture permeable layers, and wherein the pliable moisture permeable layer is configured to permit moisture ingress to the plurality of drain channels;

wherein each of the pliable moisture permeable and impermeable layers and the pliable drainage framework are configured to comply around corners; and wherein the exterior surface of the pliable moisture impermeable layer is recessed from the pliable moisture permeable layer with the plurality of support struts and drainage channels therebetween.

16. The draining construction wrap of claim 15, wherein the plurality of support struts brace the strut support faces in a flush planar configuration.

17. The draining construction wrap of claim 15, wherein the plurality of support struts position and brace the strut support faces and the pliable moisture permeable layer relative to the pliable moisture impermeable layer across a strut gap corresponding to a length of the strut bodies.

18. The draining construction wrap of claim 15, wherein strut body is rigid relative to the pliable moisture impermeable layer.

19. The draining construction wrap of claim 15, wherein the strut body includes a strut profile.

20. The draining construction wrap of claim 19, wherein a composite strut coverage area of the strut profiles of the plurality of support struts is less than the channel coverage area of the plurality of drain channels.

21. The draining construction wrap of claim 15, wherein the strut support face includes a planar strut support face, and the planar strut support faces of the plurality of support struts are flush.

22. The draining construction wrap of claim 15, wherein the pliable moisture permeable layer is configured to permit moisture ingress to the plurality of drain channels between the support struts.

23. The draining construction wrap of claim 15, wherein one or more of the pliable moisture permeable layer or the pliable moisture impermeable layer includes a non-woven substrate.

24. The draining construction wrap of claim 15,
wherein the strut bodies of the plurality of support struts brace the pliable moisture permeable layer and recess the pliable moisture impermeable layer from the pliable moisture permeable layer with a strut gap therebetween.

25. The draining construction wrap of claim 15, wherein the support struts of the plurality of support struts are arranged in one or more of rows or columns, and the support struts and the pliable moisture impermeable layer are the boundaries of the drain channels between the support struts in the rows or columns.

26. The draining construction wrap of claim 15, wherein the pliable moisture impermeable layer is bonded with an inner wall panel prior to installation of the inner wall panel.

27. The draining construction wrap of claim 15, wherein the separate support struts are coupled together with portions of the pliable moisture impermeable layer and portions of the pliable moisture permeable layer extending between the separate support struts.

28. The draining construction wrap of claim 27, wherein the portions of pliable moisture impermeable layer and the portions of the pliable moisture permeable layer are directly coupled with the separate support struts.

* * * * *